US012746174B2

(12) United States Patent
Huang

(10) Patent No.: US 12,746,174 B2
(45) Date of Patent: Sep. 29, 2026

(54) FOOT ARCH MASSAGE ARRANGEMENT

(71) Applicant: FUJIAN YITAIKANG ELECTRONICS CO., LTD, Fuzhou City (CN)

(72) Inventor: Binlong Huang, Fuzhou City (CN)

(73) Assignee: FUJIAN YITAIKANG ELECTRONICS CO., LTD, Fuzhou City (CN)

( * ) Notice: Subject to any disclaimer, the term of this patent is extended or adjusted under 35 U.S.C. 154(b) by 0 days.

(21) Appl. No.: 19/417,346

(22) Filed: Dec. 12, 2025

(65) Prior Publication Data

US 2026/0165904 A1 Jun. 18, 2026

(30) Foreign Application Priority Data

Dec. 13, 2024 (CN) ........................ 202423089686.4

(51) Int. Cl.
*A61H 7/00* (2006.01)

(52) U.S. Cl.
CPC ..... *A61H 7/007* (2013.01); *A61H 2201/0207* (2013.01); *A61H 2201/1215* (2013.01); *A61H 2201/1238* (2013.01); *A61H 2201/1409* (2013.01); *A61H 2201/1463* (2013.01); *A61H 2201/1642* (2013.01); *A61H 2201/1664* (2013.01); *A61H 2201/1671* (2013.01); *A61H 2201/1695* (2013.01); *A61H 2205/12* (2013.01)

(58) Field of Classification Search
CPC ................ A61H 7/007; A61H 2205/12; A61H 2201/1238; A61H 2201/1409; A61H 2201/1671; A61H 2201/1215
See application file for complete search history.

(56) References Cited

U.S. PATENT DOCUMENTS

| | | | | |
|---|---|---|---|---|
| 2006/0142676 A1* | 6/2006 | Fujii | A61H 7/007 601/99 |
| 2007/0021694 A1* | 1/2007 | Shiraishi | A61H 7/001 601/134 |
| 2010/0137758 A1* | 6/2010 | Nagamitsu | A61H 7/004 601/97 |
| 2017/0273857 A1* | 9/2017 | Ishikawa | A61H 9/0092 |
| 2018/0036195 A1* | 2/2018 | Zou | A61H 1/0266 |
| 2019/0321259 A1* | 10/2019 | Zhou | A61H 7/007 |

FOREIGN PATENT DOCUMENTS

| | | | |
|---|---|---|---|
| CN | 206867401 U * | 1/2018 | A61H 9/00 |
| CN | 110882128 A * | 3/2020 | A61H 1/00 |
| CN | 116077319 A * | 5/2023 | A61H 9/0078 |

* cited by examiner

*Primary Examiner* — Brandy S Lee
*Assistant Examiner* — Mishal Zahra Hussain
(74) *Attorney, Agent, or Firm* — Ying-Ting Chen

(57) ABSTRACT

A foot arch massage arrangement includes a housing, an arch massage part disposed in the housing, a motor and an elevating assembly which is arranged to drive the arch massage part to move up and down while the arch massage part is also driven to rotate when the motor is in operation, so as to allow the arch massage part to conform to the arch curve of different users.

17 Claims, 30 Drawing Sheets

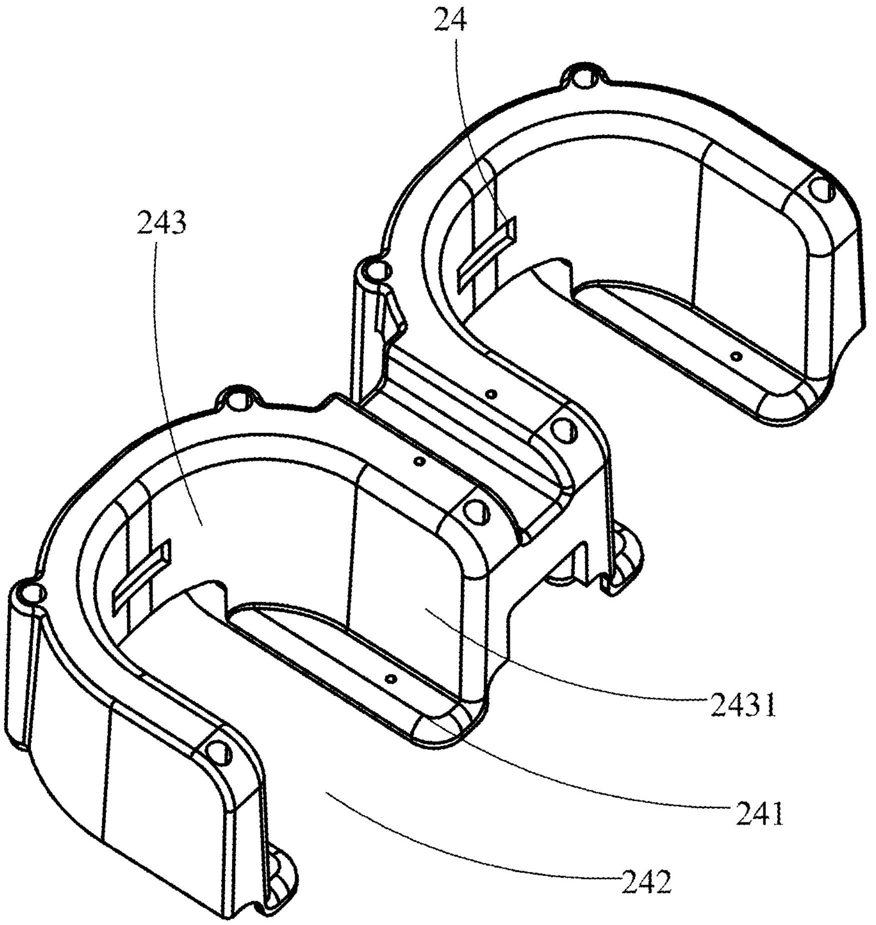
FIG, 30

FOOT ARCH MASSAGE ARRANGEMENT

CROSS REFERENCE OF RELATED APPLICATION

This application is a non-provisional application that claims priority under 35 U.S.C. § 119 to China application number CN202423089686.4, filing date Dec. 13, 2024, wherein the entire content of which is expressly incorporated herein by reference.

BACKGROUND OF THE PRESENT INVENTION

Field of Invention

The present invention relates to the technical field of massage equipment, and more particularly to a foot arch massage arrangement.

Description of Related Arts

Foot massagers can massage the feet, relieve fatigue, and promote blood circulation. However, conventional foot massagers generally have design shortcomings and are difficult to meet the personalized needs of different groups of people.

Because everyone's arch height varies significantly, for example, people with flat feet have lower arches, while those who wear high heels for extended periods may have excessively high arches, conventional foot massagers typically use a fixed shape or a single mode, making it impossible to effectively adjust to the user's arch height and achieve a targeted foot massage effect. Furthermore, conventional massagers have limited coverage and stimulation intensity in the arch area, often only applying pressure to the flat surface of the foot and failing to conform to the arch curve for a deep massage. This results in a poor massage experience for users, and may even fail to relieve foot soreness or fatigue due to inadequate massage.

SUMMARY OF THE PRESENT INVENTION

The invention is advantageous in that it provides a height-adjustable foot arch massage arrangement that can fit the arch of the foot at different heights for massage, providing good massage comfort and applicability.

Another advantage of the present invention is to provide a foot arch massage arrangement, wherein through the cooperation of the arch massage part, airbag and mounting case, the airbag can drive the mounting case to rise or fall vertically when inflated or deflated, thereby driving the arch massage part to rise or fall vertically. This allows the arch massage part to conform to the arch curve of different users, effectively solving the problem that conventional foot massagers cannot provide targeted massage for users with different arch heights, and significantly improving the comfort of the massage.

Another advantage of the present invention is to provide a foot arch massage arrangement, wherein through the cooperation of the drive mechanism and the gear system, the forefoot massage part, arch massage part and hindfoot massage part can work simultaneously, so that all areas of the sole of the foot can be fully covered for massage, which further enhances the massage effect and improves the user experience.

Another advantage of the present invention is to provide a foot-arch massage arrangement in which the massage module can be driven to move forward and backward. By enabling such longitudinal displacement while the massage head simultaneously performs a rotational massage, the arrangement delivers a compound massaging effect that more closely mimics manual kneading techniques. This dual-axis motion increases the contact area between the massage head and the foot arch of the user over time, enhances stimulation of the plantar fascia and surrounding soft tissues, and helps promote deeper relaxation of tense muscles. Furthermore, the synchronized forward-and-backward motion improves blood circulation, provides a more uniform pressure distribution, and reduces localized fatigue or discomfort that may result from fixed-point massage. As a result, the overall massage experience is significantly enhanced in terms of comfort, therapeutic effectiveness, and user satisfaction.

Another advantage of the present invention is to provide a foot arch massage arrangement, after the hindfoot massage part is driven to move rearward, a portion of the massage heads of the hindfoot massage part provided thereon can be selectively hidden. As a result, the massage heads may be partially concealed or fully exposed, thereby allowing the effective massaging region to be adaptively adjusted in length to accommodate users with different foot sizes. This structural arrangement not only enhances user comfort but also improves applicability across a wider range of users by ensuring that the massage heads are positioned in alignment with the foot arch and hindfoot regions of the user. By preventing unnecessary contact between non-target areas and the massage heads, the invention further improves the precision, comfort, and therapeutic effectiveness of the massage operation.

The present invention provides a foot arch massage arrangement comprising:

a housing;

an arch massage part disposed in the housing;

a motor, wherein when the motor is in operation, the arch massage part is driven to rotate; and an elevating assembly which is arranged to drive the arch massage part to move up and down.

According to an embodiment, the elevating assembly comprises an airbag arranged under the arch massage part, the airbag is inflated to cause the arch massage part to move upward, and the airbag is deflated to cause the arch massage part to move downward.

According to an embodiment, the elevating assembly comprises a mounting case, wherein the airbag is arranged under the mounting case and the arch massage part is arranged above the mounting case.

According to an embodiment, a driving gear is rotatably disposed in the mounting case, wherein the driving gear is provided with a connecting post which is penetrating through the mounting case, the arch massage part is coupled to the connecting post, wherein the motor is in operation to cause the driving gear to rotate in the mounting case, the arch massage part is driven to rotate through the connecting post while the mounting case is prevented to rotate.

According to an embodiment, the elevating assembly further comprises one or more guide columns fixed to the housing, wherein the mounting case is coupled to the one or more guide columns in a manner that the one or more guide columns guide the upward and downward movement of the mounting case and prevent the rotation of the mounting case.

According to an embodiment, a transmission gear is coupled between the driving gear and the motor, wherein the mounting case has a transmission port for partially exposing the driving gear, so as to allow the driving gear to be meshed with the transmission gear, wherein when the transmission gear is driven to rotate by the motor, the driving gear is driven to rotate in the mounting case by the transmission gear.

According to an embodiment, the foot arch massage arrangement further comprises a forefoot massage part which comprises a gear, wherein a transition gear is meshed with the gear of the forefoot massage part, wherein the mounting case has a meshing port for partially exposing the driving gear, so as to allow the driving gear to be meshed with the transition gear, so as to drive the transition gear to rotate, so that the forefoot massage part is driven to rotate by the gear meshed with the transition gear.

According to an embodiment, the foot arch massage arrangement further comprises a hindfoot massage part and a forefoot massage part, each of the hindfoot massage part and the forefoot massage part comprises a base fixed in the housing, a turntable rotatable mounted to the base, a plurality of massage protrusions provided on the turntable and a gear, wherein a transition gear is meshed with the gear of each of the hindfoot massage part and the forefoot massage part, wherein the mounting case has two meshing ports at two opposite sides thereof for partially exposing the driving gear, so as to allow two the transition gears to be respectively meshed with the driving gear, wherein a thickness of the driving gear is smaller than a thickness of each transition gear, so as to allow the driving gear to move upward or downward along each transition gear while each of the two transition gears remain axially overlapped with the driving gear throughout an entire vertical travel of the mounting case.

According to an embodiment, the hindfoot massage part and the forefoot massage part are configured to be driven to rotate when the motor is in operation, the arch massage part is configured to be driven to rotate while being driven to move up and down when the airbag is repeatedly inflated and deflated.

According to an embodiment, the arch massage part comprises a turntable coupled to the connecting post, and a plurality of massage protrusions arranged on the turntable, wherein a support plate is mounted to the mounting case and is arranged between the mounting case and the turntable of the arch massage part, wherein a plurality of heating members are arranged on the support plate, wherein the support plate and the plurality of heating members are driven to move up and down along with the mounting case and are prevented to rotate when the turntable of the arch massage part is driven to rotate.

According to an embodiment, a worm shaft is connected to the motor and a worm gear is coupled to the worm shaft, wherein the transmission gear is coaxially arranged on top of the worm gear.

The present invention further provides a foot arch massage arrangement comprising:

- a housing having an inner cavity and two foot placement openings communicated to the inner cavity;
- two foot massage units disposed in the inner cavity of the housing, wherein each of the two foot massage units comprises an arch massage part;
- a drive mechanism which comprises a motor and two transmission gears coupled to the motor;
- a gear train assembly which comprises two driving gears which are respectively meshed with the two transmission gears; and
- an elevating assembly which comprises two mounting cases and an airbag which comprises two airbag portions, wherein each of the two driving gears is rotatably disposed in the two mounting cases, the two airbag portions are respectively arranged under the two mounting cases, the two arch massage parts are respectively rotatably arranged above the two mounting cases, wherein the motor is activated, the two driving gears are respectively driven to rotate in the two mounting cases by the two transmission gears, so as to drive the two arch massage parts to rotate, wherein when the two airbag portions are inflated or deflated, the two mounting cases are corresponding move upward or downward, so as to cause the two arch massage parts to move upward or downward.

According to an embodiment, each of the two mounting cases has a transmission port for partially exposing the corresponding driving gear, so as to allow each driving gear to be meshed with the corresponding transmission gear.

According to an embodiment, each of the two foot massage unit further comprises a hindfoot massage part and a forefoot massage part, wherein each of the two mounting cases has two meshing ports at two opposite sides thereof for partially exposing the driving gear, wherein the gear train assembly comprises two transition gears which are respectively meshed with the driving gear through the two meshing ports, wherein each of the hindfoot massage part and the forefoot massage part comprises a gear which is meshed with the corresponding transition gear.

According to an embodiment, a thickness of the driving gear is smaller than a thickness of each transition gear, so as to allow the driving gear to move upward or downward along each transition gear while each of the two transition gears remain axially overlapped with the driving gear throughout an entire vertical travel of the corresponding mounting case.

According to an embodiment, each of the hindfoot massage part and the forefoot massage part comprises a base fixed in the housing, a turntable rotatable mounted to the base, a plurality of massage protrusions provided on the turntable, wherein each of the two airbag portions is arranged between the base of the hindfoot massage part and the base of the forefoot massage part.

According to an embodiment, the drive mechanism further comprises a worm shaft connected to the motor and two worm gears coupled to two opposite sides of the worm shaft, wherein the two transmission gears are respectively coaxially arranged on top of the two worm gears.

According to an embodiment, each of the two mounting cases comprises a case body which comprises an upper case portion and a lower case portion mounted to the upper case portion to define an inner chamber, each of the two mounting cases further comprises a bottom base which is protruded from the lower case portion and extended into the inner chamber, wherein the bottom base has an engaging hole, a bottom of each corresponding driving gear is provided with an engaging post which is engaged with the engaging hole in a manner that the rotation of each driving gear is allowed on the corresponding bottom base, wherein each of the two driving gears is provided with a connecting post which is penetrating through the upper case portion of the case body, each arch massage part is coupled to the corresponding connecting post.

According to an embodiment, each of the two arch massage parts comprises a turntable coupled to the corresponding connecting post, and a plurality of massage protrusions arranged on the turntable, wherein a support plate is mounted to the upper case portion of the case body and is arranged between the mounting case and the turntable of the arch massage part, wherein a plurality of heating members are arranged on the support plate, wherein the support plate and the plurality of heating members are driven to move up and down along with the mounting case and are prevented to rotate when the turntable of the arch massage part is driven to rotate.

According to an embodiment, the foot arch massage arrangement further comprises two ankle support frames each comprising a bottom wall having an elongated groove, and a surrounding wall extended from the bottom wall, wherein each hindfoot massage part is disposed in the corresponding elongated grooves.

According to an embodiment, the elevation assembly further comprises one or more guide columns which are fixed to the housing, each of the two mounting cases has one or more guide holes aligned and engaged with the one or more guide columns respectively.

The present invention further provides a foot arch massage arrangement comprising:

- a housing;
- an arch massage part disposed in said housing;
- a motor which is activated to cause the arch massage part to rotate; and
- a forward-and-backward drive mechanism arranged to cause the arch massage part to horizontally move back and forth in said housing.

According to an embodiment, the forward-and-backward drive mechanism comprises a sliding case, a lead screw fixed to the sliding case, a rotation nut coupled with the lead screw through inner threads, a reduction gear meshed with outer teeth of the rotation nut, an actuator motor and a motor fixing frame for fixing the actuator motor, wherein the arch massage part is mounted and fixed to the sliding case, the reduction gear is mounted to the actuator motor and is driven by the actuator motor to rotate, so as to drive the rotation nut to rotate, and thus the lead screw is driven to rotate, and the sliding case is driven by the lead screw to move back and forth in the housing.

BRIEF DESCRIPTION OF THE DRAWINGS

FIG. 30 is a perspective view illustrating the ankle support frames of the foot arch massage arrangement according to the second embodiment of the present invention.

DETAILED DESCRIPTION OF THE PREFERRED EMBODIMENT

Figure 1:
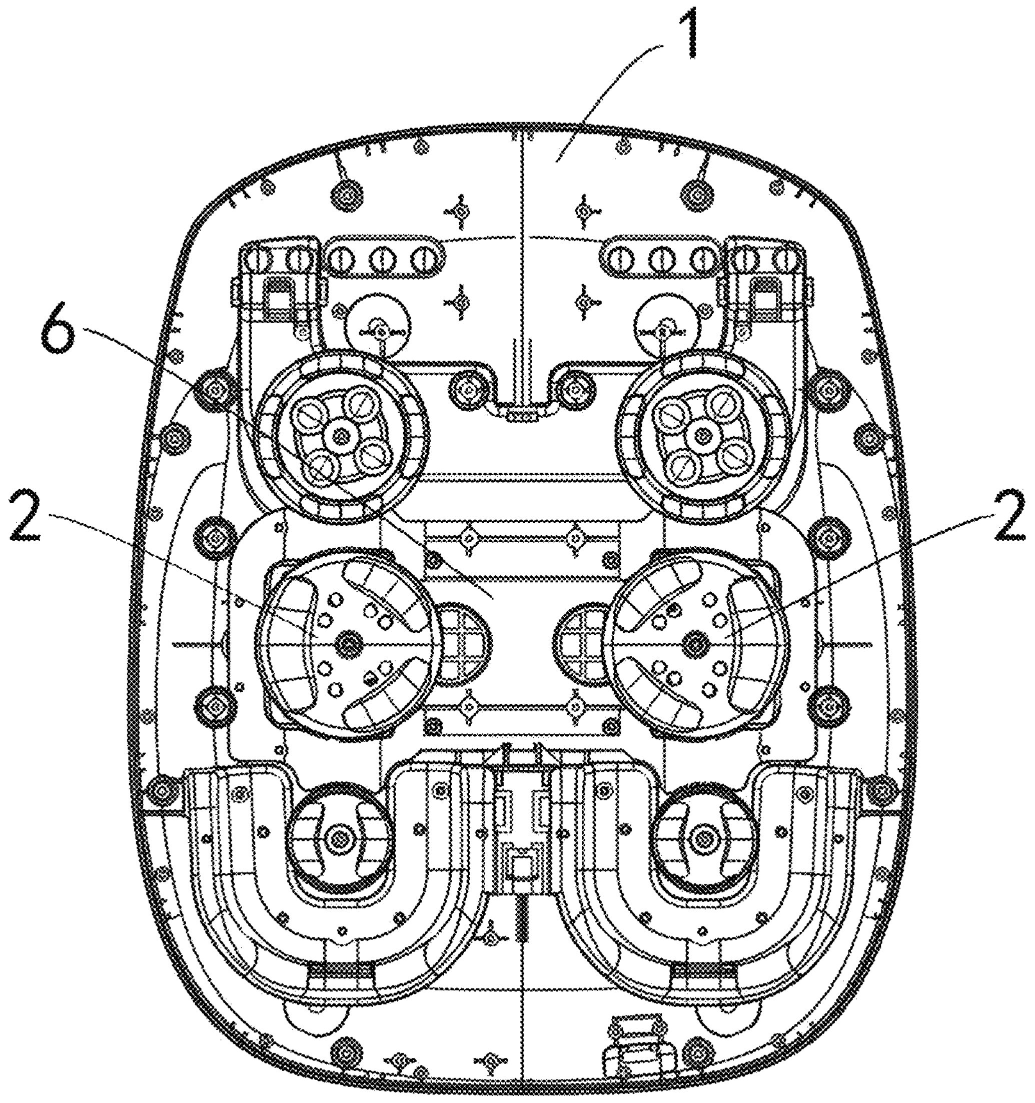
FIG. 1 is a schematic view of a foot arch massage arrangement according to a first embodiment of the present invention.
Figure 2:
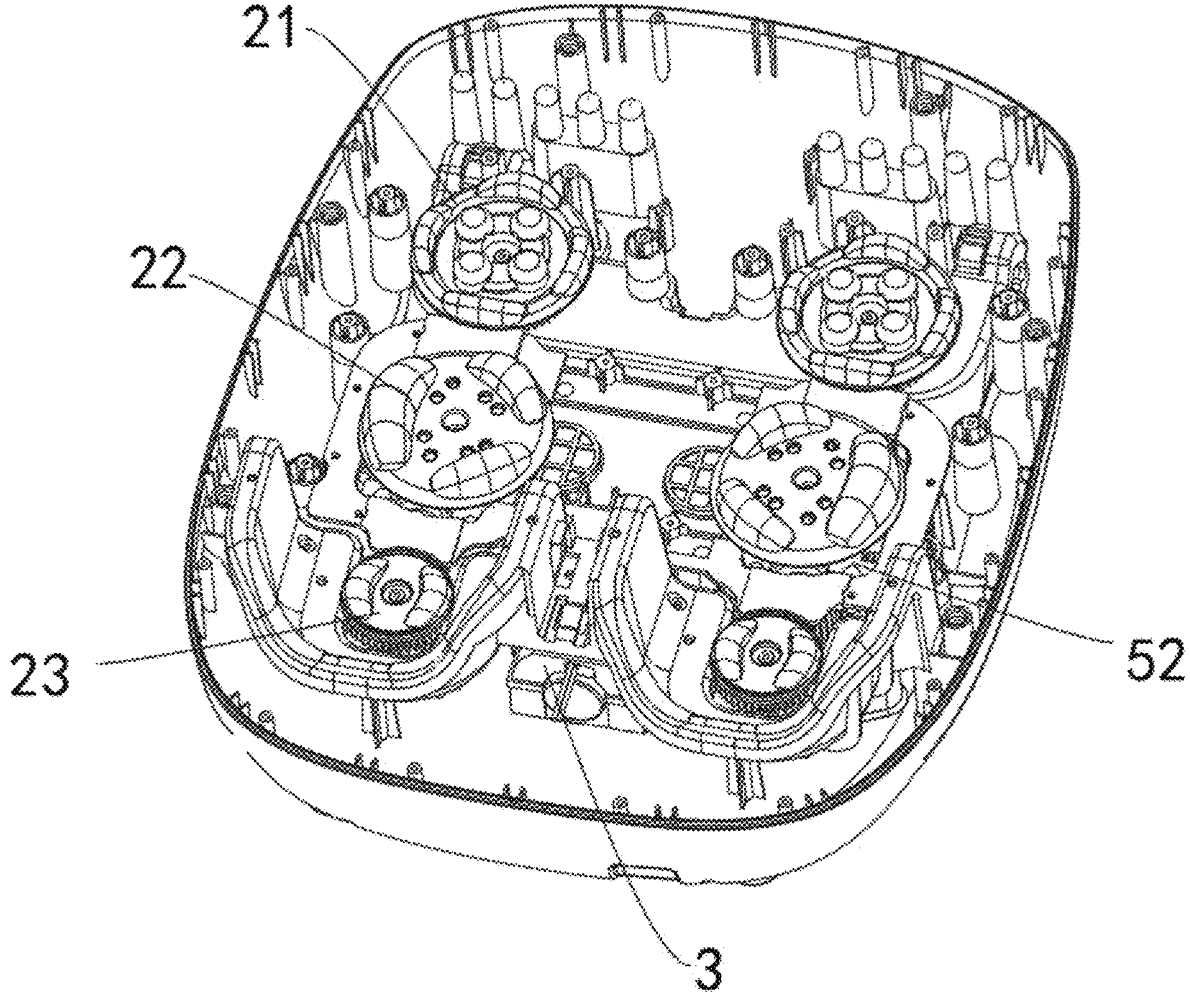
FIG. 2 is an oblique top view of FIG. 1.
Figure 3:
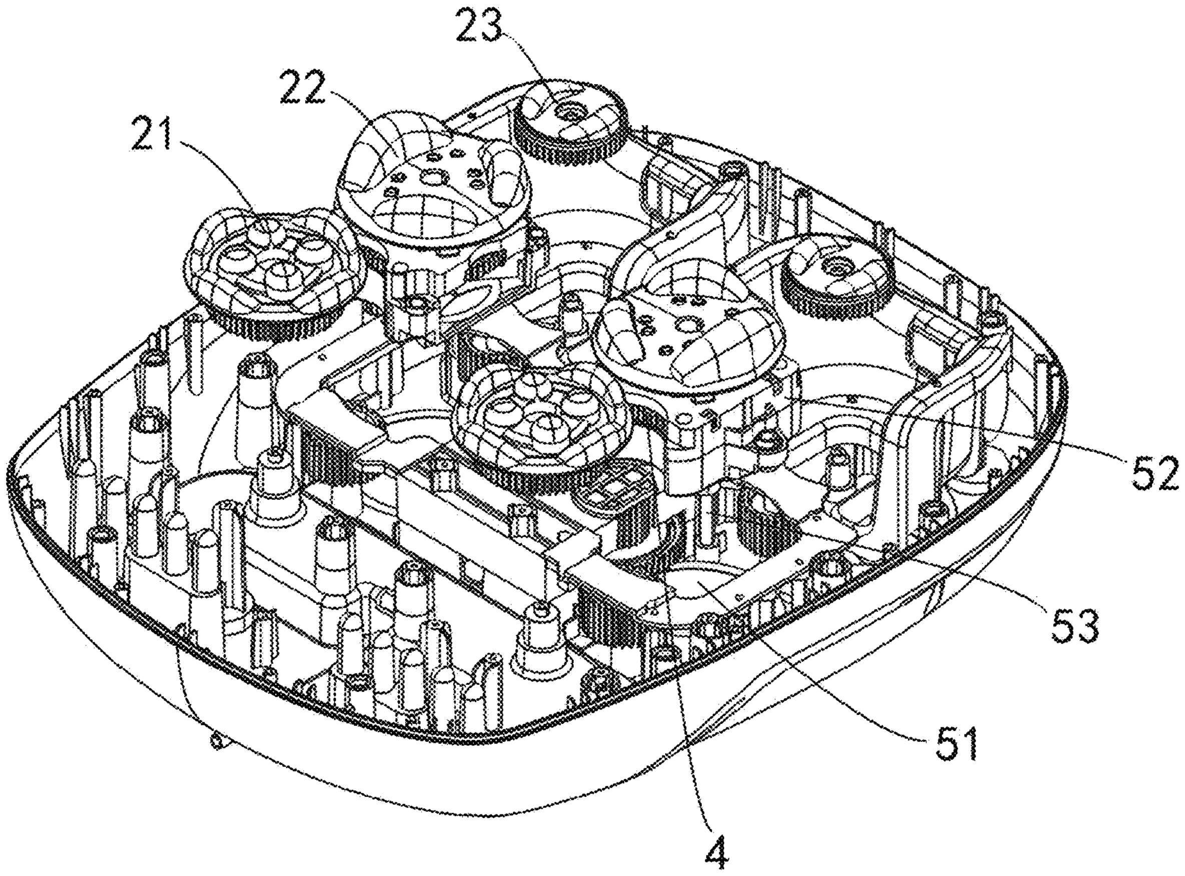
FIG. 3 is a schematic view illustrating the disassembly of the foot massage unit and the housing.
Figure 4:
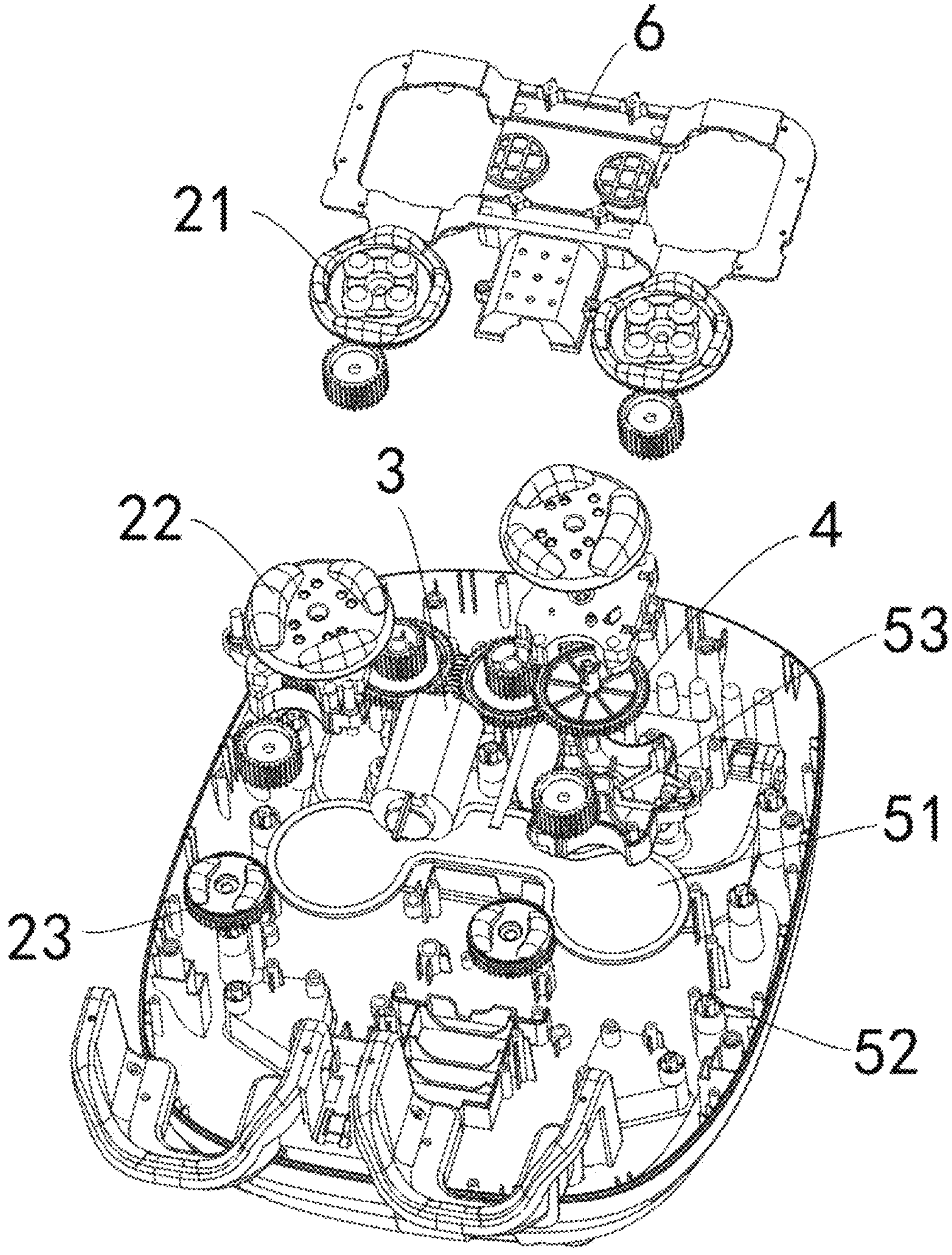
FIG. 4 is an exploded view of the structure in FIG. 1.
Figure 5:
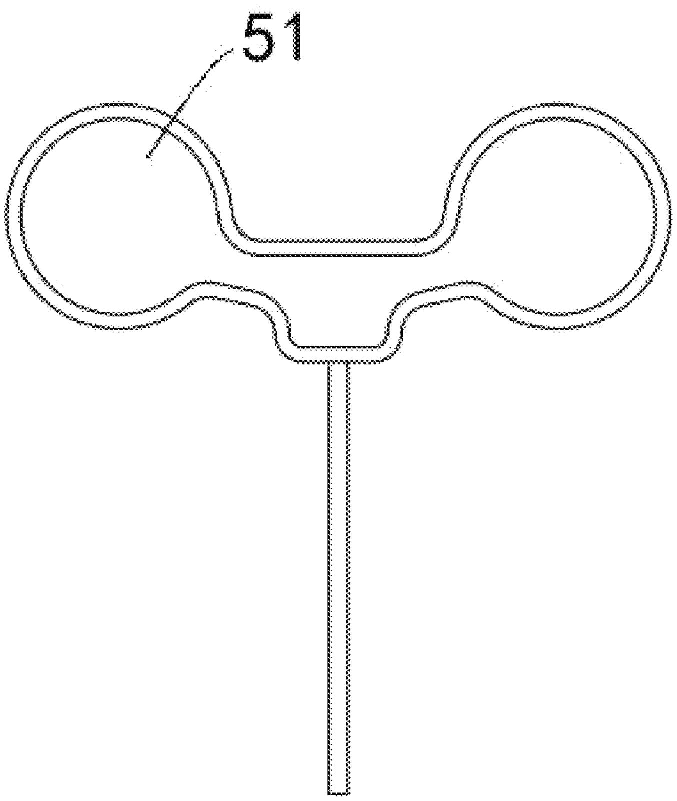
FIG. 5 is a schematic view of the structure of the Y-shaped airbag of the foot arch massage arrangement according to the first embodiment of the present invention.
Figure 6:
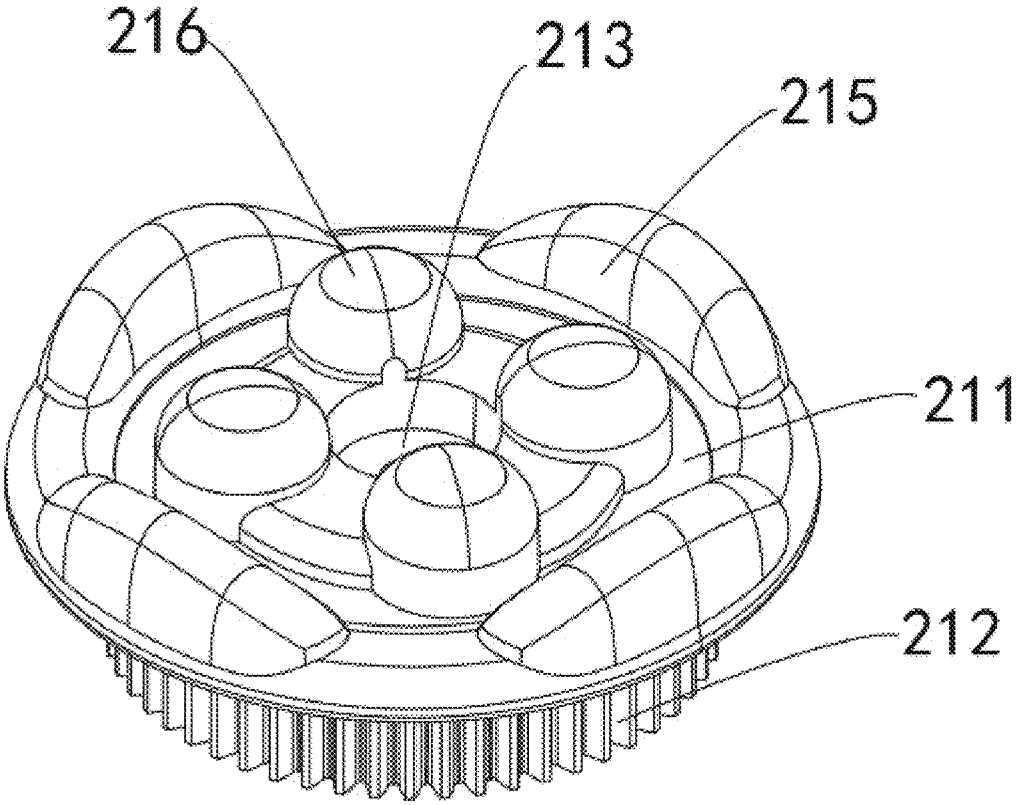
FIG. 6 is a schematic view of the structure of the forefoot massage part of the foot arch massage arrangement according to the first embodiment of the present invention.
Figure 7:
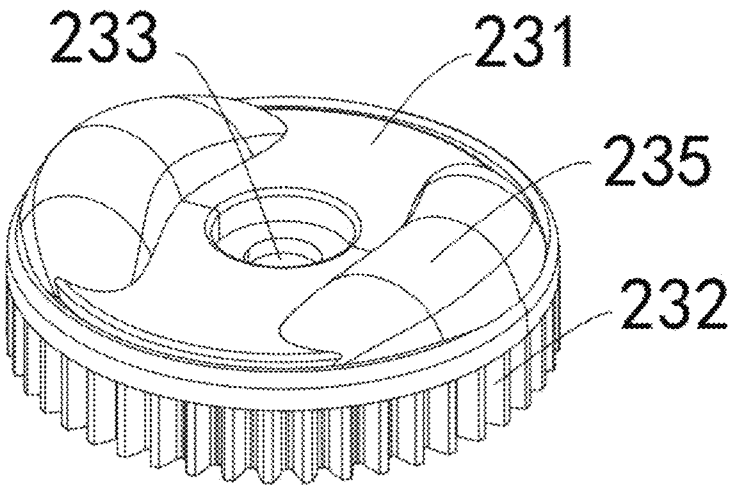
FIG. 7 is a schematic view of the structure of the hindfoot massage part of the foot arch massage arrangement according to the first embodiment of the present invention.
Figure 8:
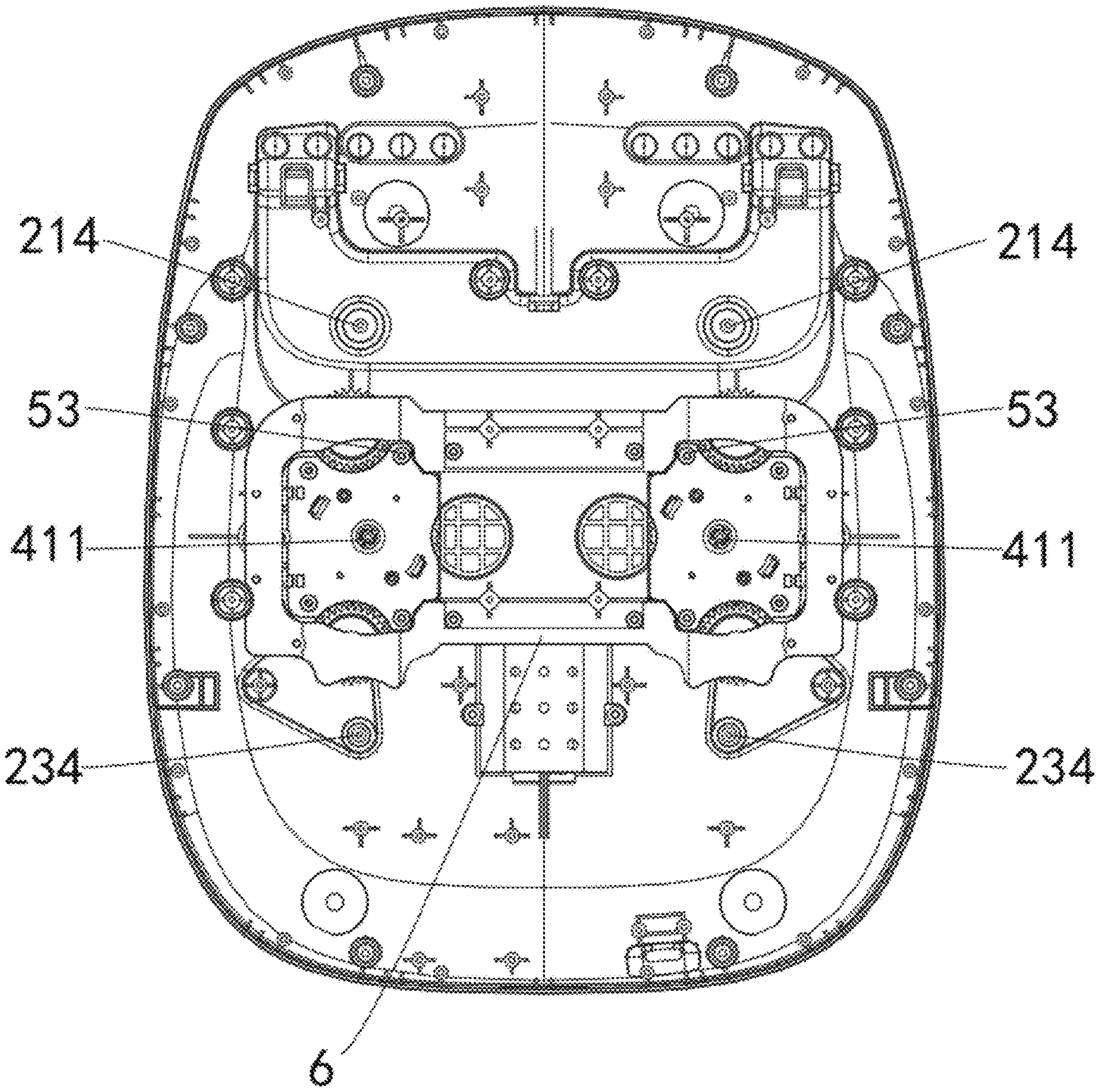
FIG. 8 is a schematic view illustrating the foot arch massage arrangement with disassembled foot massage unit according to the first embodiment of the present invention.
Figure 9:
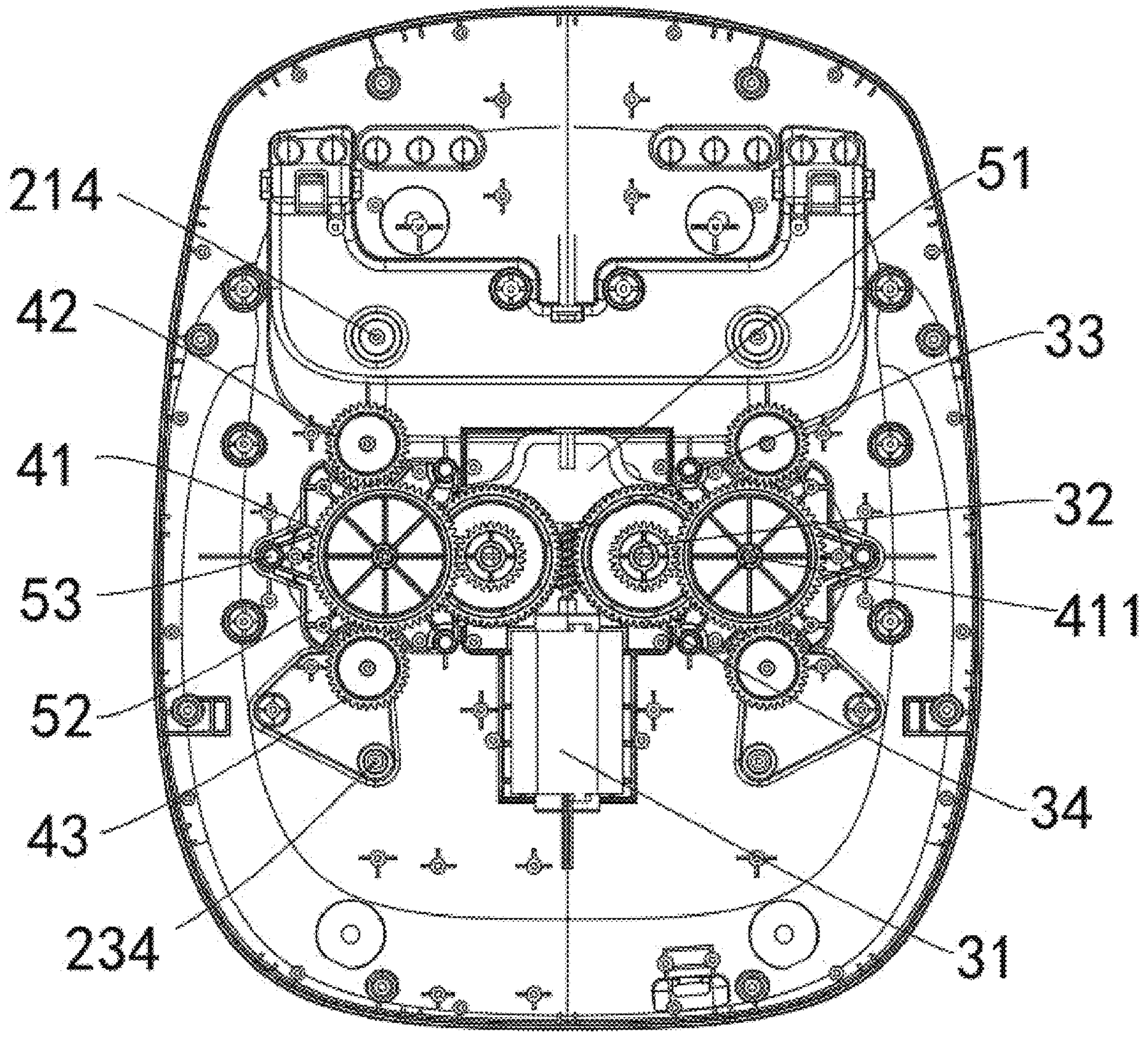
FIG. 9 is a schematic view of a gear train assembly of the foot arch massage arrangement according to the first embodiment of the present invention.
Figure 10:
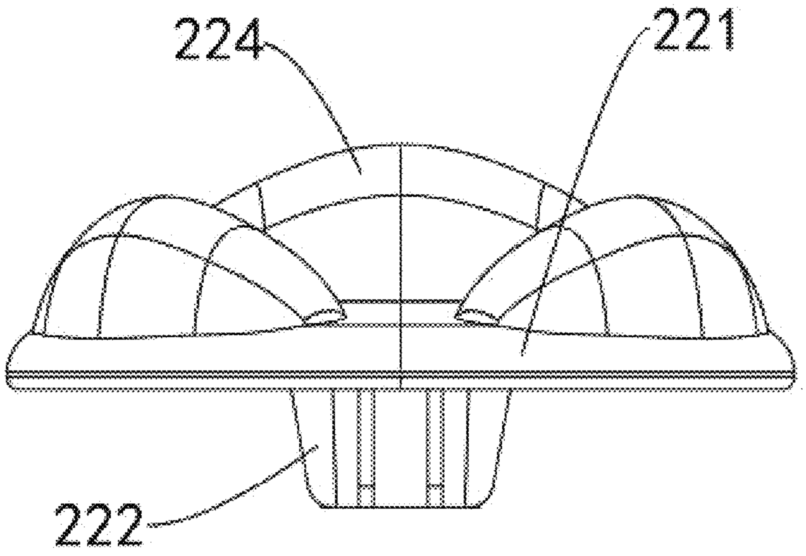
FIG. 10 is a schematic view of the arch massage part of the foot arch massage arrangement according to the first embodiment of the present invention.
Figure 11:
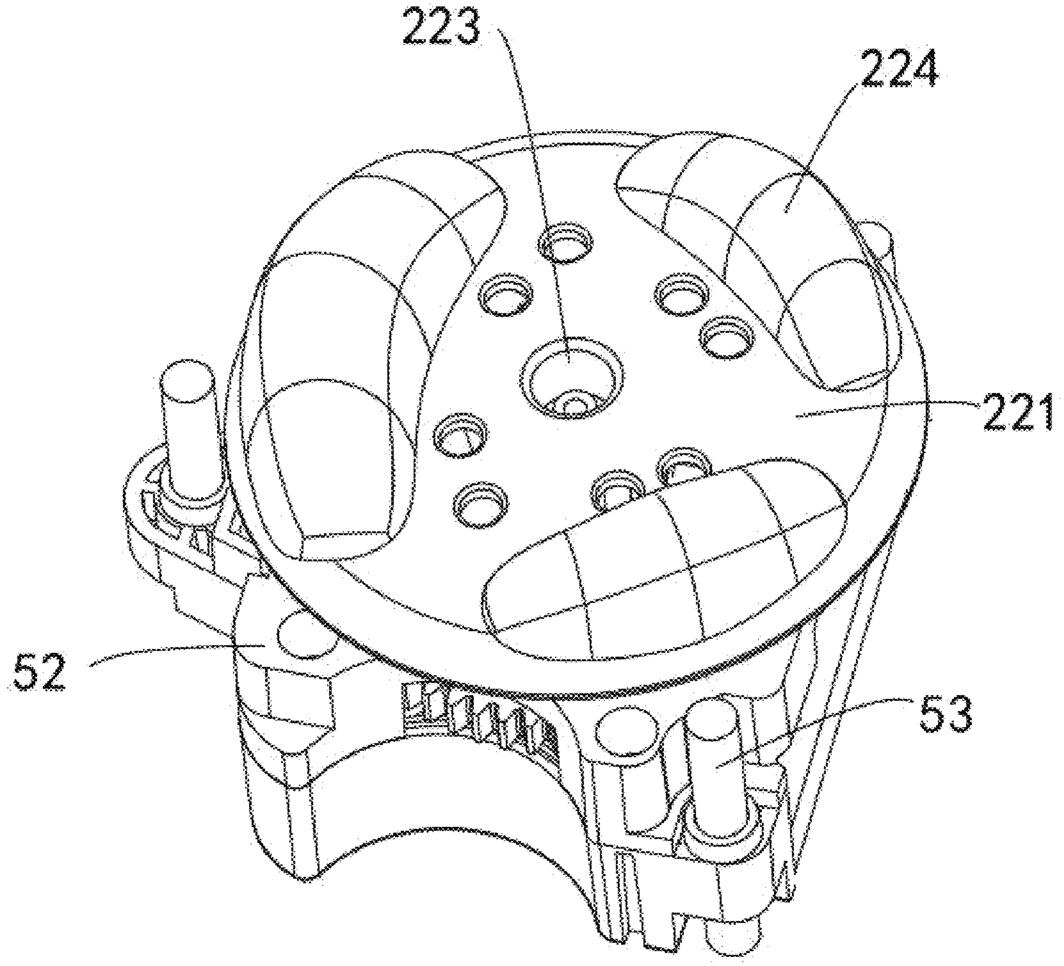
FIG. 11 is an assembly schematic view illustrating the foot arch massage part, the mounting case and the driving gear of the foot arch massage arrangement according to the first embodiment of the present invention.
Figure 12:
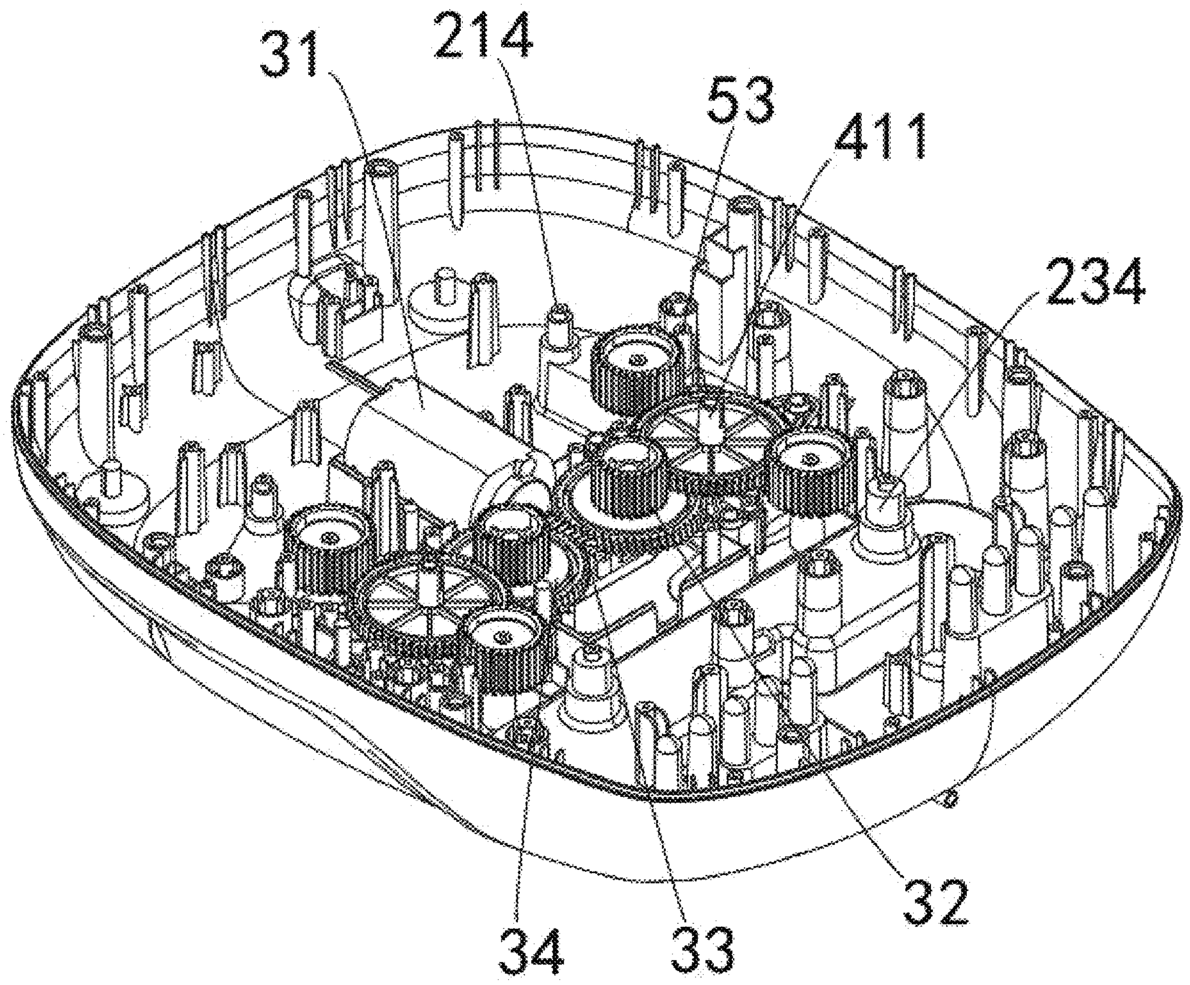
FIG. 12 is a schematic view illustrating the cooperation between the drive mechanism and the gear train assembly of the foot arch massage arrangement according to the first embodiment of the present invention.
Figure 13:
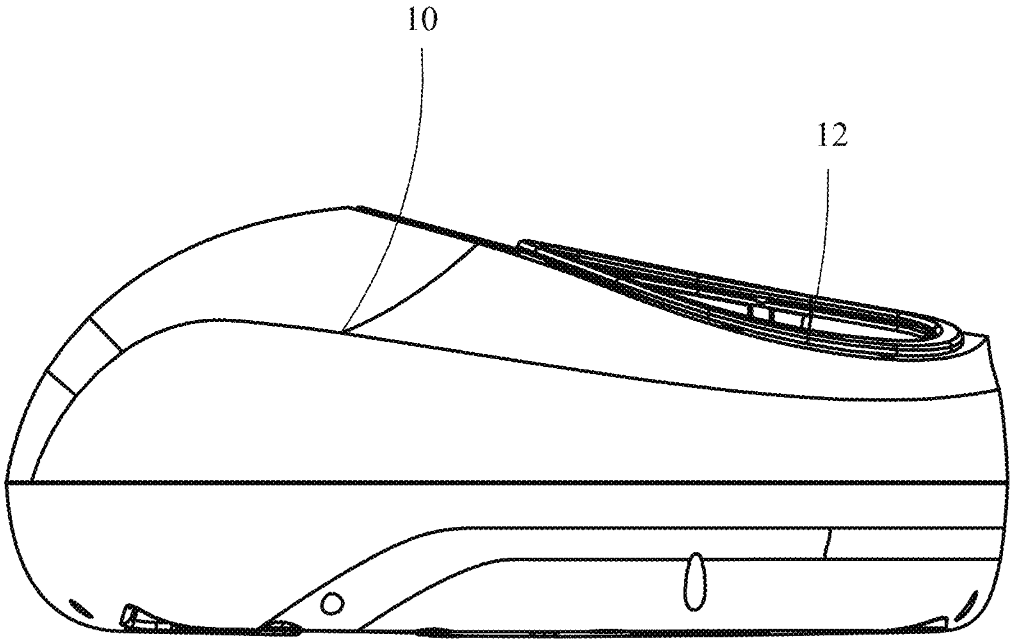
FIG. 13 is a schematic view of the foot arch massage arrangement according to the first embodiment of the present invention.
Figure 14:
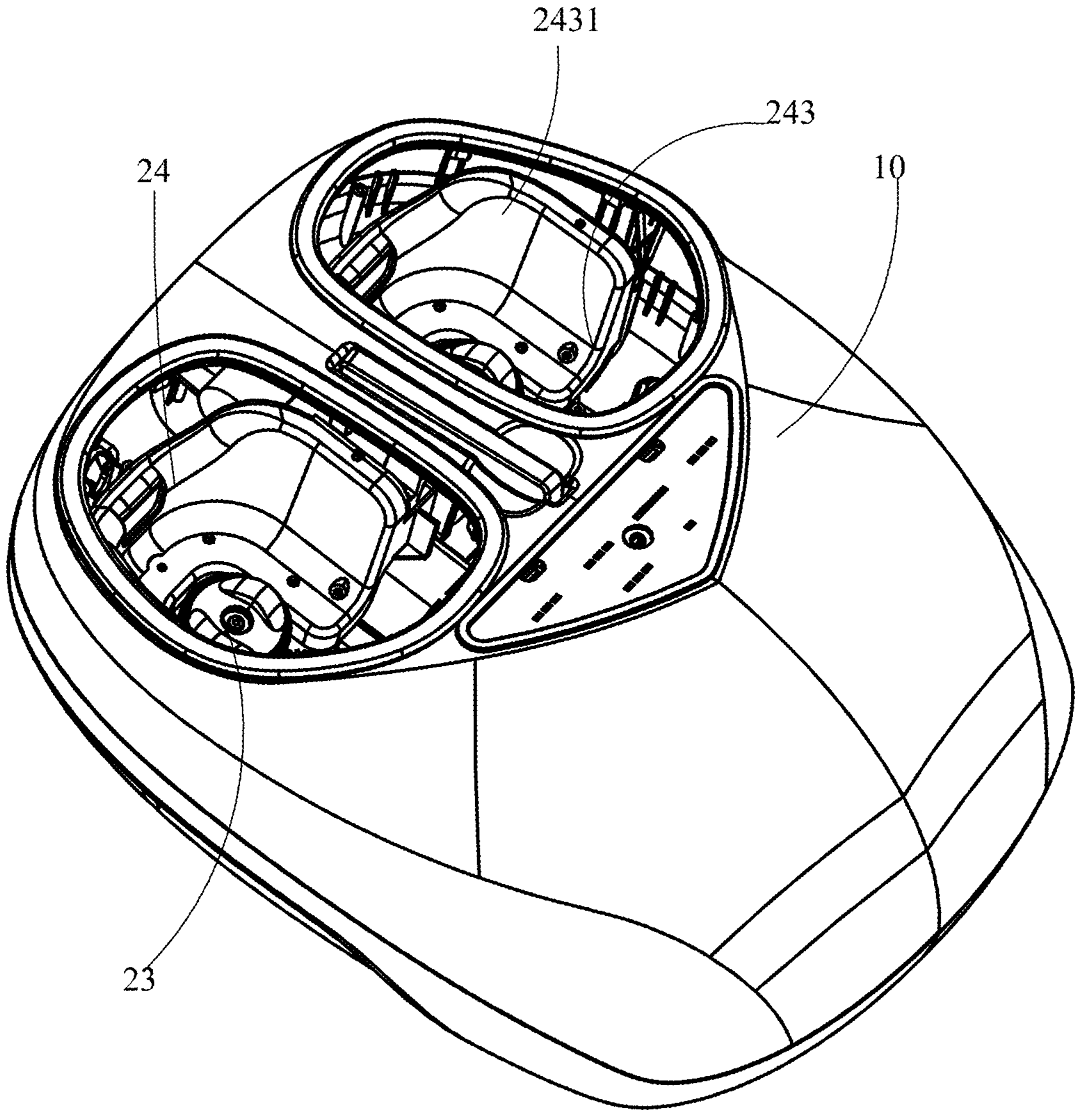
FIG. 14 is a perspective view of the foot arch massage arrangement according to the first embodiment of the present invention.
Figure 15:
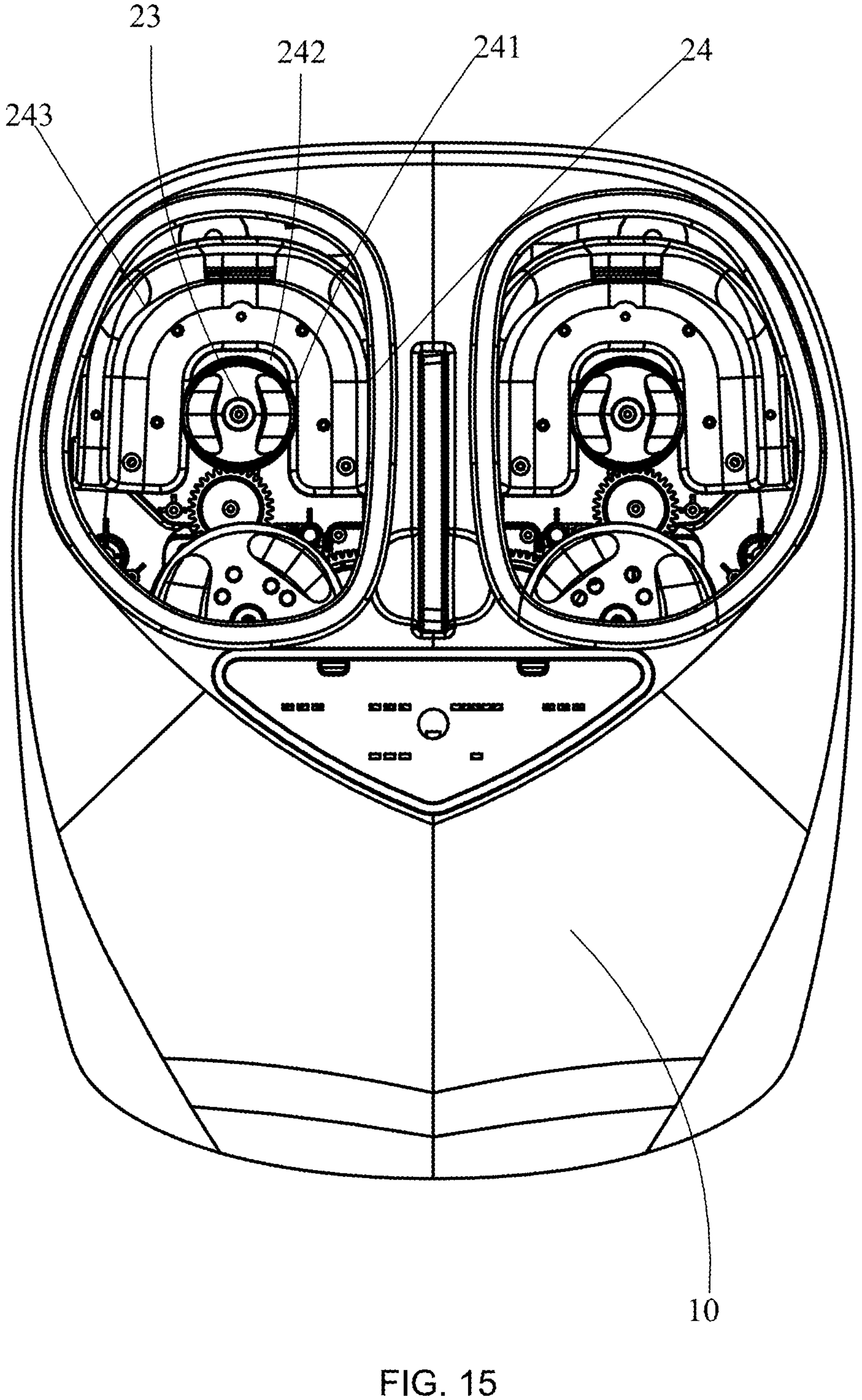
FIG. 15 is another perspective view of the foot arch massage arrangement according to the first embodiment of the present invention.
Figure 16:
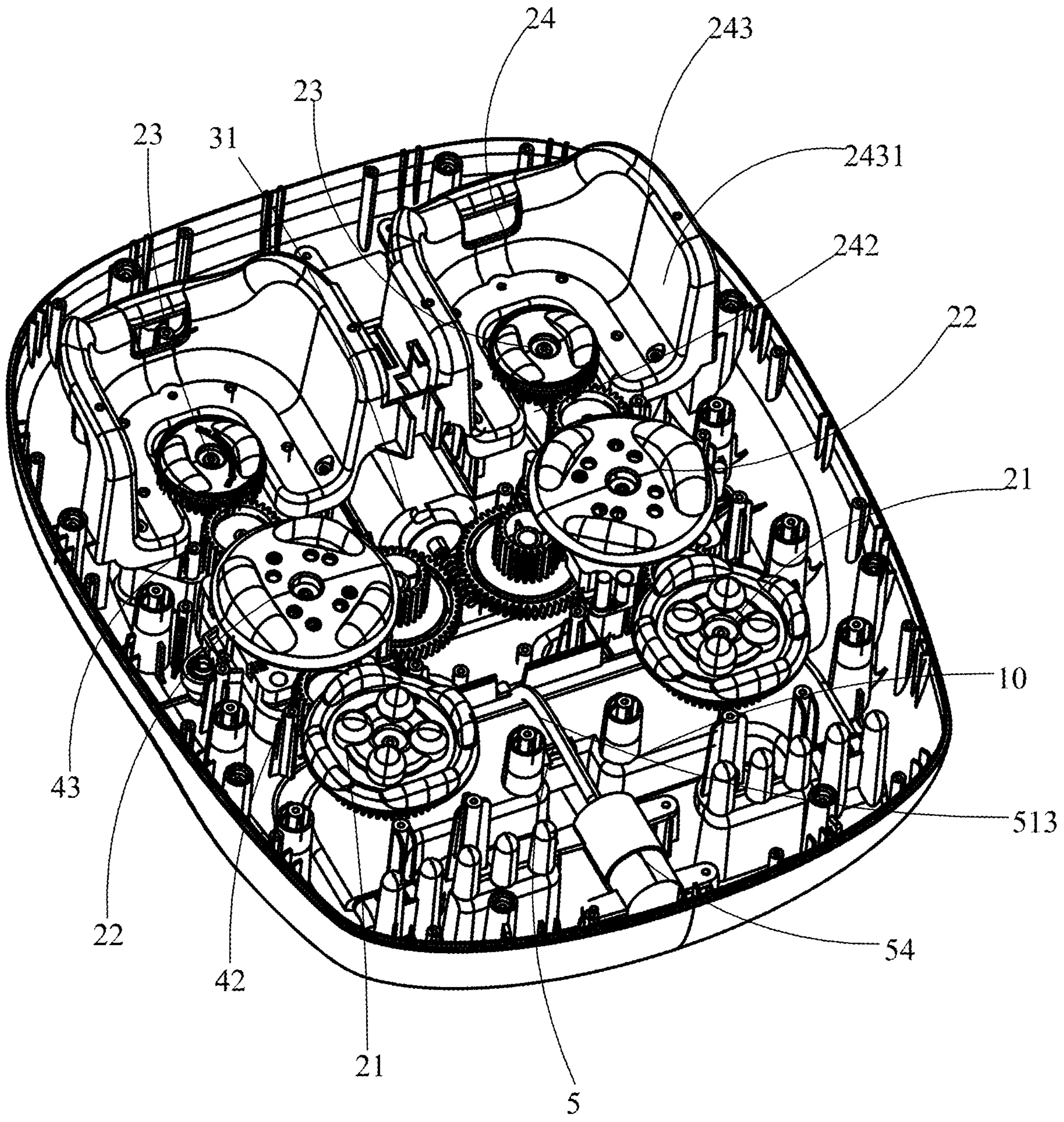
FIG. 16 is another perspective view of the foot arch massage arrangement according to the first embodiment of the present invention, wherein a top housing part of the housing is removed.
Figure 17:
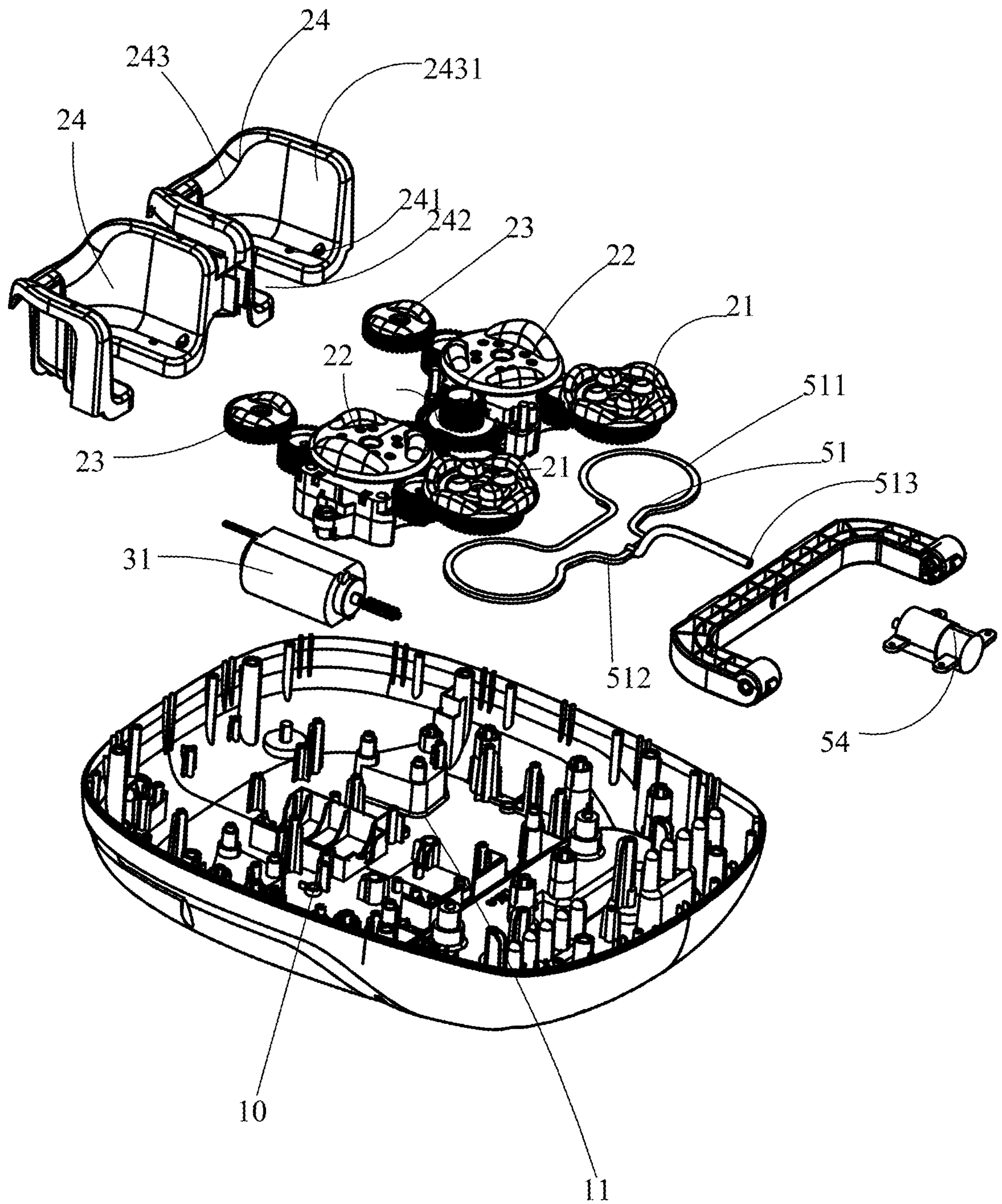
FIG. 17 is an exploded view illustrating the foot arch massage arrangement according to the first embodiment of the present invention.

The present invention will now be described in detail with reference to the accompanying drawings and embodiments.

FIGS. 1-23 illustrates a foot arch massage arrangement according to an embodiment of the present invention. The foot arch massage arrangement comprises a housing 1, two foot massage units 2 which are spaced apart inside the housing 1, a drive mechanism 3 which is fixed inside the housing at a middle of the housing 1, a gear train assembly 4 connected between each foot massage unit 2 and the drive mechanism 3, and an elevating assembly 5 located below the two foot massage units 2.

Each foot massage unit 2 comprises a forefoot massage part 21, an arch massage part 22, and a hindfoot massage part 23 arranged sequentially at intervals. The elevating assembly 5 comprises a Y-shaped airbag 51 and a mounting case 52 arranged below each corresponding arch massage part 22. The Y-shaped airbag 51 is located below the mounting cases 52, and the left and right end portions of the Y-shaped airbag 51 correspond to the positions of the left and right mounting cases 52.

The air inlet of the Y-shaped airbag 51 is communicated to the outer side of the housing 1, and the inflation or deflation of the left and right end portions of the Y-shaped airbag 51 can drive the mounting cases 52 to rise or fall vertically.

The forefoot massage part 21 comprises a turntable 211, a gear 212, and has a shaft hole 213. The gear 212 is fixed to the bottom of the turntable 211, and the shaft hole 213 passes through the middle of the turntable 211 and the gear 212. The forefoot massage part 21 further comprises a base 214 that is engaged with the shaft hole 213 and fixed on the housing 1.

The top edge of the turntable 211 is provided with a plurality of massage protrusions 215, and the top of the turntable 211 is also provided with a plurality of massage ball heads 216 arranged circumferentially around the shaft hole 213.

The hindfoot massage part 23 comprises a turntable 231, a gear 232, and has a shaft hole 233. The gear 232 is fixed to the bottom of the turntable 231, and the shaft hole 233 passes through the middle of the turntable 231 and the gear 232. The hindfoot massage part 23 further comprises a base 234 that is engaged with the shaft hole 233 and fixed on the housing 1. A plurality of massage protrusions 235 are also arranged around the top edge of the turntable 231.

The gear train assembly 4 comprises driving gears 41 rotatably provided in the mounting cases 52. The front side of each driving gear 41 meshes with the gear 212 on its corresponding side, and the rear side of each driving gear 41 meshes with the gear 232 on its corresponding side. The drive mechanism 3 is located between the two driving gears 41 and can drive the two driving gears 41 to rotate simultaneously. The front side, rear side, and one side corresponding to the drive mechanism 3 of the mounting case 52 are all provided with meshing ports. The top side of the mounting case 52 is also provided with a hole. The top of the driving gear 41 is provided with a connecting post 411 extending upward out of the hole.

Each driving gear 41 is provided with a transition gear 42 meshing with the front side of gear 212, and a transition gear 43 meshing with the rear side of gear 232.

The foot arch massage part 22 comprises a turntable 221, a connecting base 222, and has a shaft hole 223. The connecting base 222 is connected to the bottom of the turntable 221. The shaft hole 223 passes through the middle of the turntable 221 and the connecting base 222. The connecting post 411 is inserted and fixed to the shaft hole 223. A plurality of massage protrusions 224 are also arranged around the top edge of the turntable 221.

The drive mechanism 3 comprises a motor 31 and two transmission gears 32. The motor 31 is fixed inside the housing 1. The output end of the motor 31 is connected to a worm shaft 33 located between the two foot arch massage parts 22. worm gears 34 are meshed on two sides of the worm shaft 33. The two transmission gears 32 are coaxially fixed on the top of the two worm gears 34, and each transmission gear 32 meshes with the driving gear 41 on its corresponding side.

In some embodiments, the drive mechanism 3 comprises a motor 31 and two transmission gears 32. The motor 31 is fixed inside the housing 1, and the output shaft of the motor 31 extends upward. The output shaft of the motor 31 is connected to a drive gear located between two foot arch massage parts 22. Driven gears are meshed on two sides of the drive gear. The two transmission gears 32 are coaxially fixed on the top of the two driven gears, and each transmission gear 32 meshes with the driving gear 41 on its corresponding side.

Preferably, a control unit electrically connected to the motor 31 is installed inside the housing 1, and both the control unit and the motor 31 are electrically connected to an external power source.

The driving gear 41 meshes simultaneously with the transmission gear 32, the transition gear 42, and the transition gear 43, and the thickness of the driving gear 41 is less than the thickness of the transmission gear 32, the thickness of the transition gear 42, and the thickness of the transition gear 43.

A gear protective cover 6 is also provided above the drive mechanism 3.

The mounting case 52 is also provided with a number of guide columns 53 that slide with it, and the bottom end of the guide column 53 is fixed to the inside of the housing 1.

Furthermore, the mounting case 52 comprises an upper cover and a lower cover, which are detachably connected, and the driving gear 41 is rotatably connected between the upper cover and the lower cover.

The working principle of the present invention is as follows.

When the motor 31 is supplied with power to rotate, the worm shaft 33 is driven to rotate the worm gears 34 on two sides. The worm gears 34 drive coaxial transmission gears 32 to rotate. Since the transmission gear 32 is meshed with driving gear 41, and the two driving gears 41 are respectively meshed with gear 212 of the forefoot massage part 21 and the gear 232 of the hindfoot massage part 23 through the transition gears 42 and 43 respectively. The rotation of the transmission gear 32 can drive the forefoot massage part 21 and the hindfoot massage part 23 to move synchronously, so as to realize full coverage massage of forefoot, arch and hindfoot areas.

Meanwhile, the Y-shaped airbag 51 of the elevating assembly 5 is connected to an external air passage. The Y-shaped airbag 51 changes its height by inflating or deflating. When the Y-shaped airbag 51 is inflated, the airbag 51 pushes the mounting cases 52 to rise vertically, thereby causing the arch massage parts 22 located above the mounting cases 52 to rise. When the Y-shaped airbag 51 is deflated, the mounting cases 52 and the arch massage parts 22 fall, so that the arch massage parts 22 fit the arch curve of different users, achieving targeted massage and further improving the massage effect and comfort.

More specifically, the foot arch massage arrangement comprises the housing 1 having an inner cavity 11 and one or more foot placement openings 12, one or more foot massage units 2 which are arranged inside the housing 1, the drive mechanism 3 which is fixed inside the housing 1 at a middle of the housing 1, the gear train assembly 4 connected between the one or more foot massage units 2 and the drive mechanism 3, and an elevating assembly 5 located below the one or more foot massage units 2.

In this embodiment, the housing 1 has two foot placement openings 12 communicated to the inner cavity 11, and two foot massage units 2 are arranged inside the housing 1 to simultaneously massage two feet of the user, the drive mechanism 3 and the gear train assembly 4 are arranged to simultaneously drive the two foot massage units 2 to provide the massage effect.

By providing two foot placement openings 12 together with two independent foot massage units 2, the arrangement enables both feet to be massaged at the same time. This not only reduces the overall massage time but also enhances the sense of balance of the user and comfort during operation.

The placement of the drive mechanism 3 at the middle of the housing 1 allows the driving force to be evenly distributed to the left and right massage units through the gear train assembly 4. This symmetrical configuration reduces vibration, minimizes noise, and ensures stable and consistent massage performance.

The gear train assembly 4 provides efficient power transmission from the drive mechanism 3 to each foot massage unit 2. The use of gears also enables precise control over the rotational speed, torque, and motion profile of the massage heads, thereby improving the accuracy and effectiveness of the massage.

The two foot placement openings 12 create a natural, ergonomic posture for the user to insert both feet. The positioning and spacing of the openings facilitate a comfortable stance that aligns the foot arches directly above the massage units, thereby increasing the efficiency of arch stimulation.

Because the inner cavity 11 can house separate massage units and adjustable assemblies, users with varying foot lengths can comfortably place their feet inside the housing without misalignment. This adaptability improves universality and expands applicability across different user groups.

By centralizing the drive mechanism 3 and gear train assembly 4, internal space is optimally utilized. This results in a compact device that is easier to store and place in household environments while still offering high-performance massage capabilities Two flexible foot pockets can be coupled to the two foot placement openings 12, so that the two feet of the user can be put into the two flexible foot pockets which are disposed in the inner cavity 11 of the housing.

Accordingly, the flexible foot pockets are disposed above the corresponding foot massage units 2 to provide a soft, compliant contact surface that reduces direct friction between the skin of the user and the rigid housing or massage components. This lowers the risk of irritation, pressure marks, or discomfort during long massage sessions. The foot pockets act as a protective barrier preventing sweat, debris, or skin particles from entering the inner cavity 11 and the mechanical components. This makes the device more hygienic and easier to maintain, and the foot pockets themselves can be designed to be removable or washable.

Each foot massage unit 2 comprises the arch massage part 22 which comprises the turntable 221 with the massage protrusions 224, the connecting base 222 and has the shaft hole 223 penetrating through the turntable 221 and the connecting base 222. The elevation assembly 5 comprises the airbag 51, the mounting case 52 disposed at a bottom of each arch massage part 22 and an air pump 54 connected to the airbag 51 to inflate or deflate the airbag 51. When the airbag 51 is inflated, the mounting case 52 above the airbag 51 is lifted, so that the arch massage part 22 above the mounting case 52 is lifted. When the airbag 51 is deflated, the mounting case 52 is lowered, so that the arch massage part 22 is lowered.

Accordingly, the inflation level of the airbag 51 allows the arch massage part 22 to be moved smoothly to various height positions, providing fine-tuned adjustment instead of relying on fixed-step mechanical lifting structures. Because different users have different foot-arch profiles, the airbag-based elevation assembly 5 enables the arch massage part 22 to precisely match the natural arch curvature of the user. This prevents excessive pressure for low-arch users and enhances deep stimulation for high-arch users.

The air pump 54 can inflate or deflate the airbag 51 in real time, enabling dynamic adjustments during the massage process. This provides a variable-intensity massage that adapts to user preference or programmed massage modes. In addition, compared with rigid mechanical linkages, the airbag 51 provides a cushioning effect while lifting the arch massage part 22. This contributes to a gentler change in height, reducing sudden impacts and enhancing the overall massage experience.

The airbag 51 also functions as a natural vibration absorber. The soft air medium reduces mechanical noise and dampens vibrations generated by the rotating massage components, improving product smoothness and perceived quality. The vertical lifting using the airbag 51 occupies less mechanical space than screw-rod or motor-driven elevation mechanisms. This allows for more efficient arrangement of the drive mechanism, gear train, and massage units inside the housing 1.

The airbag-based system minimizes direct contact between hard mechanical parts, reducing wear, friction, and the need for regular lubrication or maintenance. This improves device reliability and durability. The elevation force of the airbag 51 is inherently limited compared with rigid mechanisms, reducing the risk of pinching or excessive pressure on the foot of the user. In overload conditions, the airbag 51 simply compresses rather than causing damage. The adjustable elevation enhances the variety of available massage modes, such as pressing, kneading, rolling, and arch-stretching, by varying both the vertical position and the pressure profile of the massage protrusions 224.

In this embodiment, the airbag 51 comprises two airbag portions 511, a connecting portion 512 connected between the two airbag portions 511, an air feeding pipe 513 communicated to the air pump 54 for inflating air into the connection portion 512 and the two airbag portions 511. The two airbag portions 511 are respectively disposed under two mounting cases 52 which are arranged to support two arch massage parts 22.

Because the two airbag portions 511 are connected through the connecting portion 512 and inflated simultaneously via the air feeding pipe 513, both mounting bases 52 receive substantially equal lifting force. This ensures that the two arch massage parts 22 rise and descend in a coordinated manner, preventing tilting or height imbalance during operation.

The connecting portion 512 acts as an air-distribution channel that stabilizes internal air pressure between the two airbag portions 511. This integrated configuration enhances the overall structural stability of the elevation mechanism, especially when supporting the weight and dynamic motion of both foot massage units.

When both airbag portions 511 are inflated, the corresponding arch massage parts 22 elevate at the same rate, ensuring a symmetrical massage experience on both feet. This avoids the uneven pressure that might occur if two separate, independent airbags were used.

The separated airbag portions 511 distribute the load across two independent support points rather than a single central lifting area. This reduces localized stress on the airbag and mounting structures, improving durability and long-term reliability. Since each airbag portion 511 directly supports one mounting case 52, the system can accommodate differences in the left and right foot shapes or arch heights of the user. The integrated connection portion 512 ensures that adjustments remain smooth and balanced.

The air feeding pipe 513 supplies air to both the connecting portion 512 and the two airbag portions 511 simultaneously. This centralized air delivery minimizes inflation time and allows rapid adjustments in massage height and pressure. The combined airbag structure provides the function of two synchronized lifting units while maintaining a compact footprint. This helps simplify the internal arrangement of the device and frees up space for other mechanisms such as the gear train assembly or airflow ducts.

In addition, the airbag 51 may be continually inflated or deflated to raise or lower the arch massage part 22 while the arch massage part 22 is rotating. Adjusting height during rotation allows the arch massage part 22 to approach the foot arch gradually, creating a gentle progressive-pressure massage effect that mimics professional manual techniques. By adjusting the airbag height while the arch massage part 22 is rotating, the device can automatically fine-tune the contact pressure to match the foot arch of the user. This improves ergonomics and reduces discomfort caused by excessive or insufficient pressure.

Alternatively, the airbag 51 may be inflated or deflated before the arch massage part 22 begins to rotate, or during rotation, until the arch massage part 22 reaches a suitable height. Once the desired height is achieved, inflation or deflation is stopped, allowing the arch massage part 22 to remain at that height while it continues to rotate to perform a massage on the foot arch of the user. Furthermore, once the airbag 51 stops inflation/deflation, the arch massage part 22 remains stably at the selected height. This enables consistent rotational massage without vertical drift, ensuring uniform stimulation across the entire massage cycle.

The ability to adjust the height either during rotation or before rotation provides flexible operation modes. The user can choose real-time height modulation for dynamic massage intensity, or pre-set a comfortable height before the massage begins.

Figure 18:
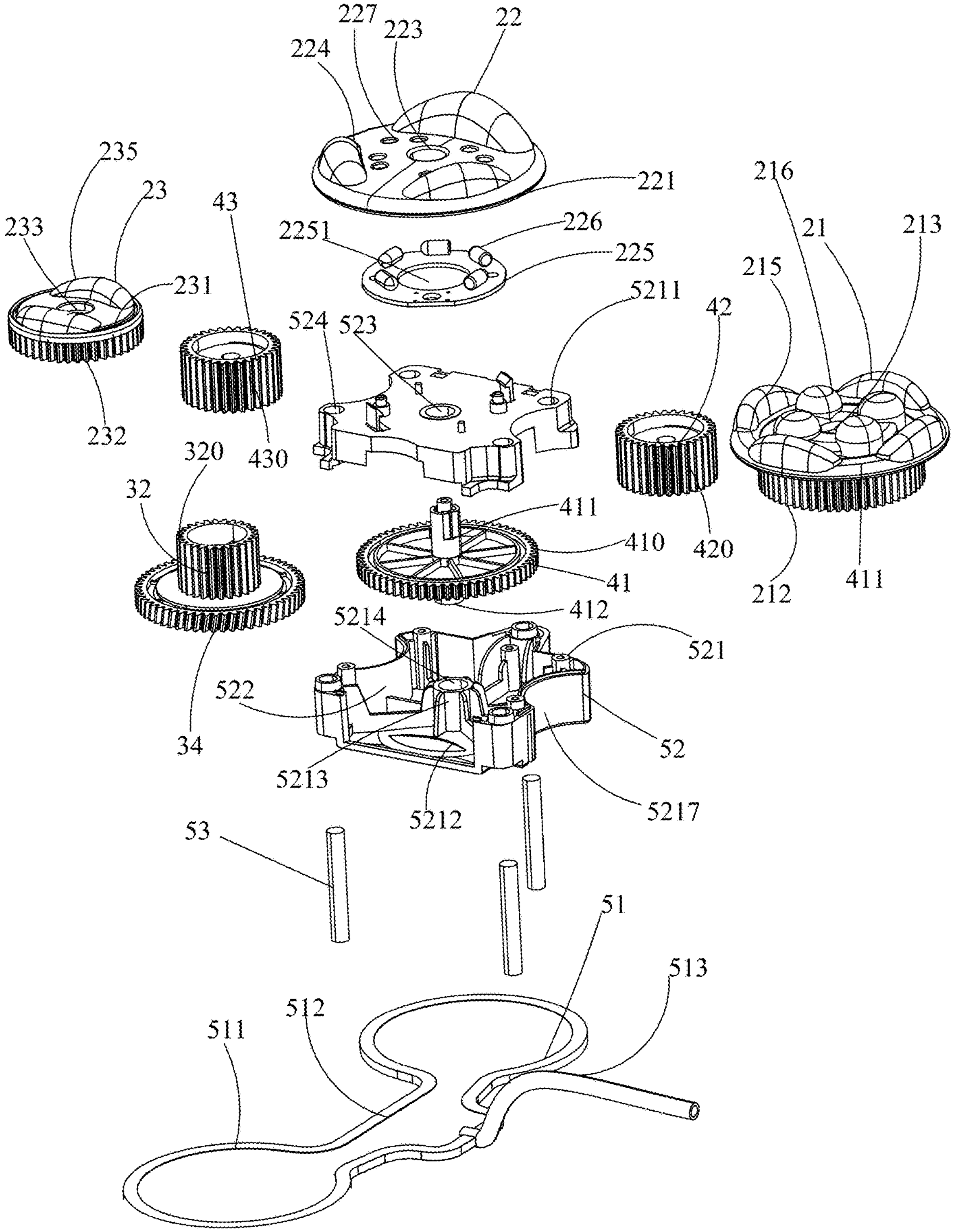
FIG. 18 is another exploded view illustrating the foot arch massage arrangement according to the first embodiment of the present invention.
Figure 19:
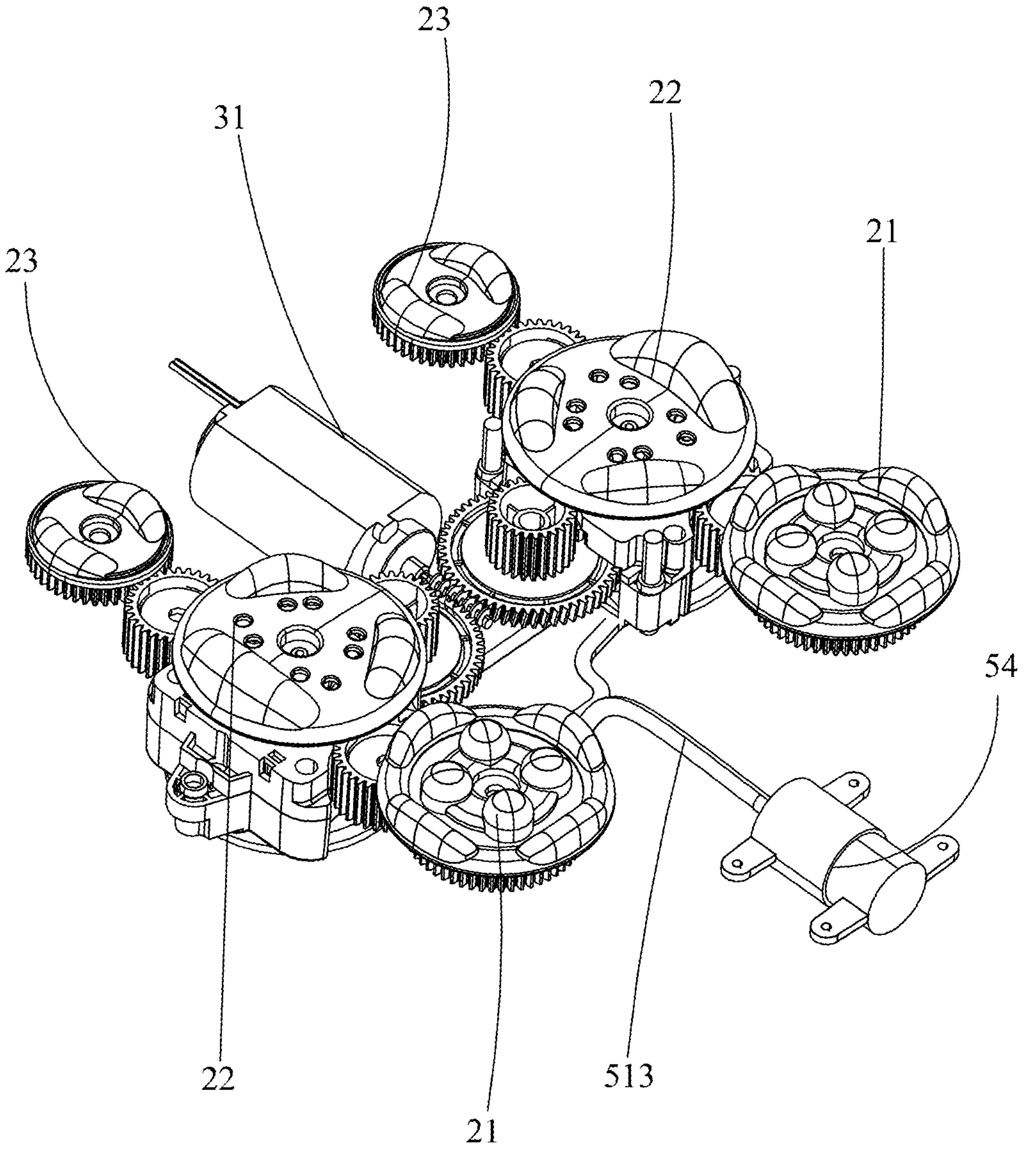
FIG. 19 is a perspective view illustrating the foot massage units and the elevating assembly of the foot arch massage arrangement according to the first embodiment of the present invention.
Figure 20:
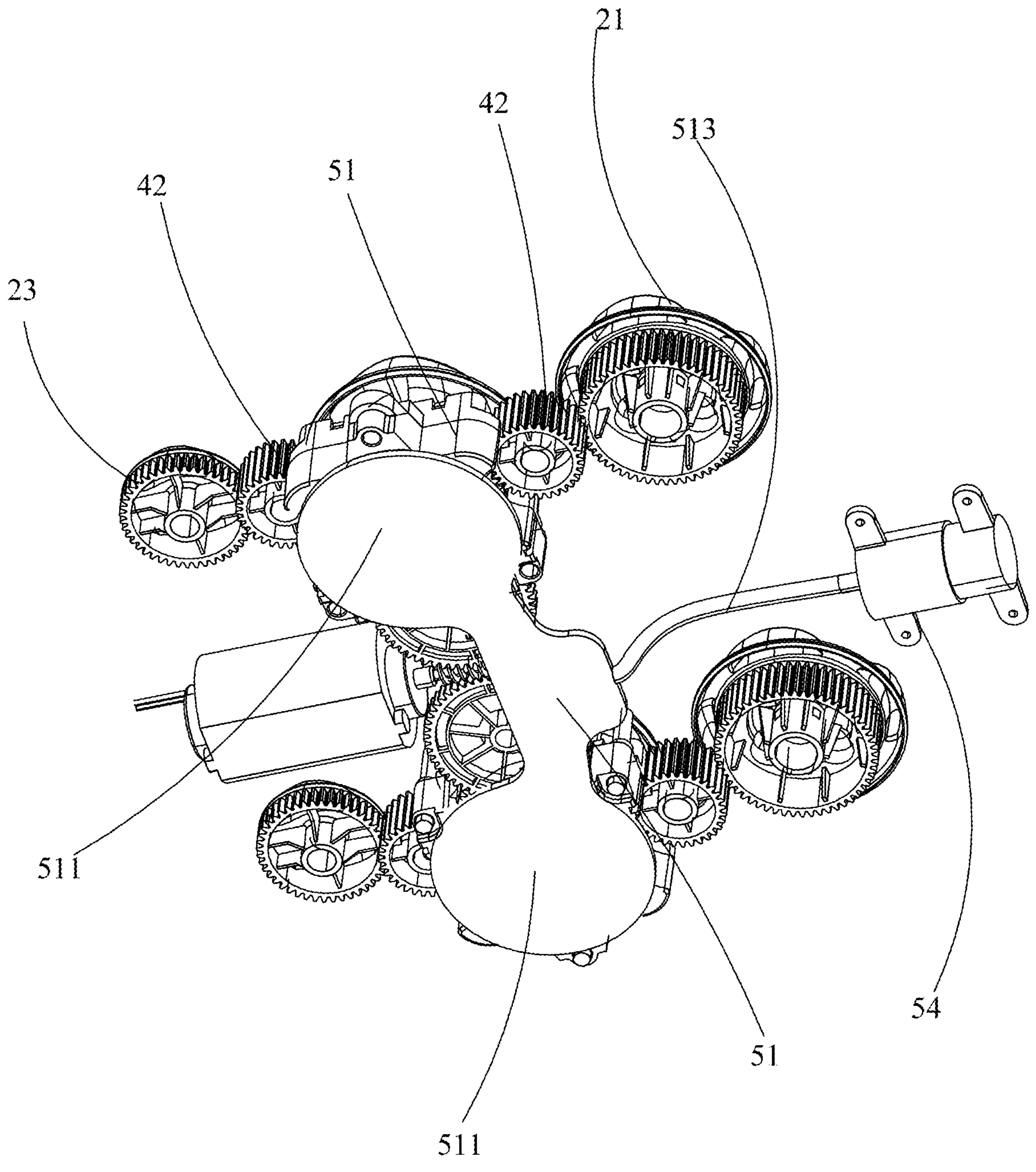
FIG. 20 is another perspective view illustrating the foot massage units and the elevating assembly of the foot arch massage arrangement according to the first embodiment of the present invention.
Figure 21:
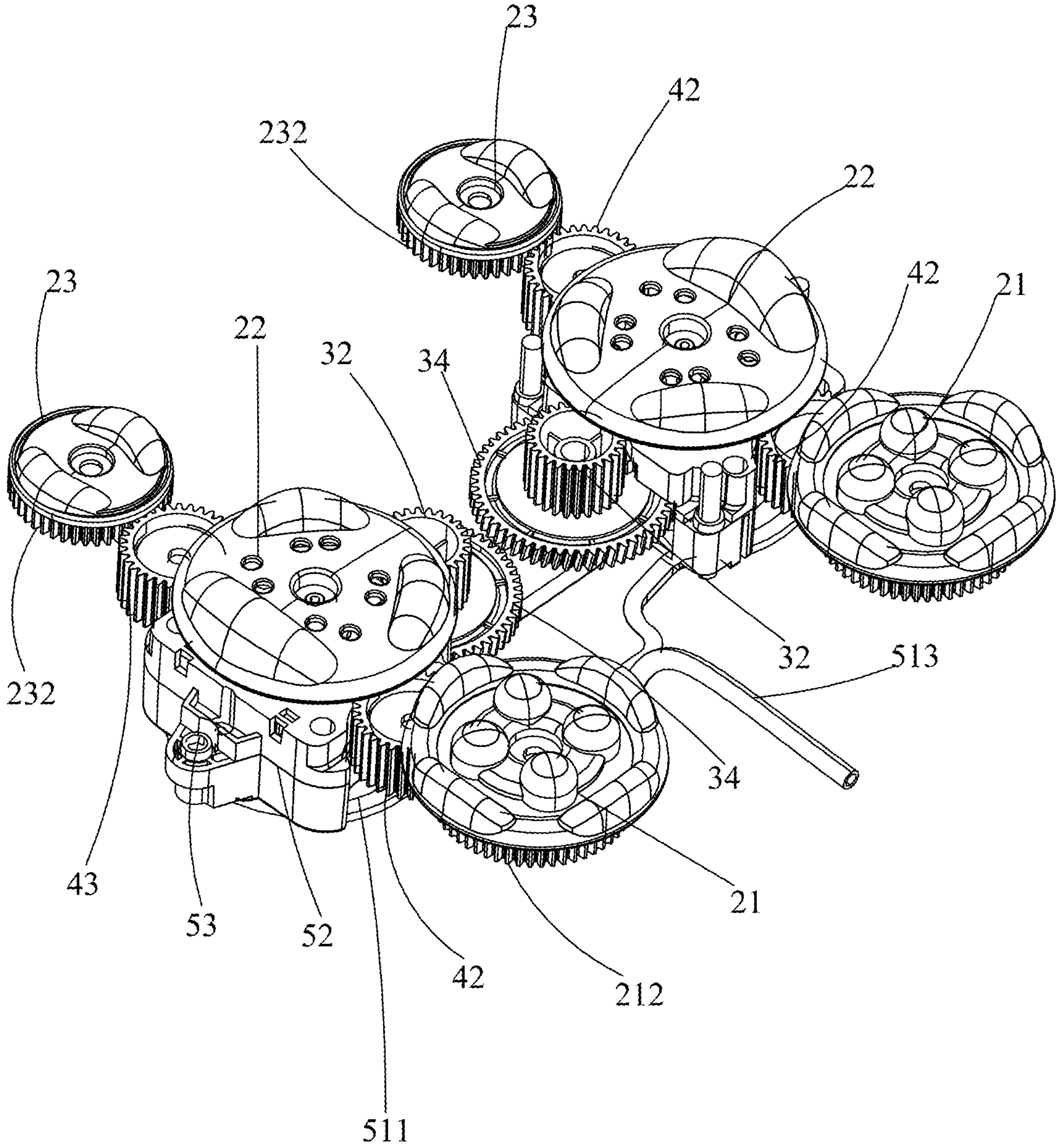
FIG. 21 is another perspective view illustrating the foot massage units and the elevating assembly of the foot arch massage arrangement according to the first embodiment of the present invention.
Figure 22:
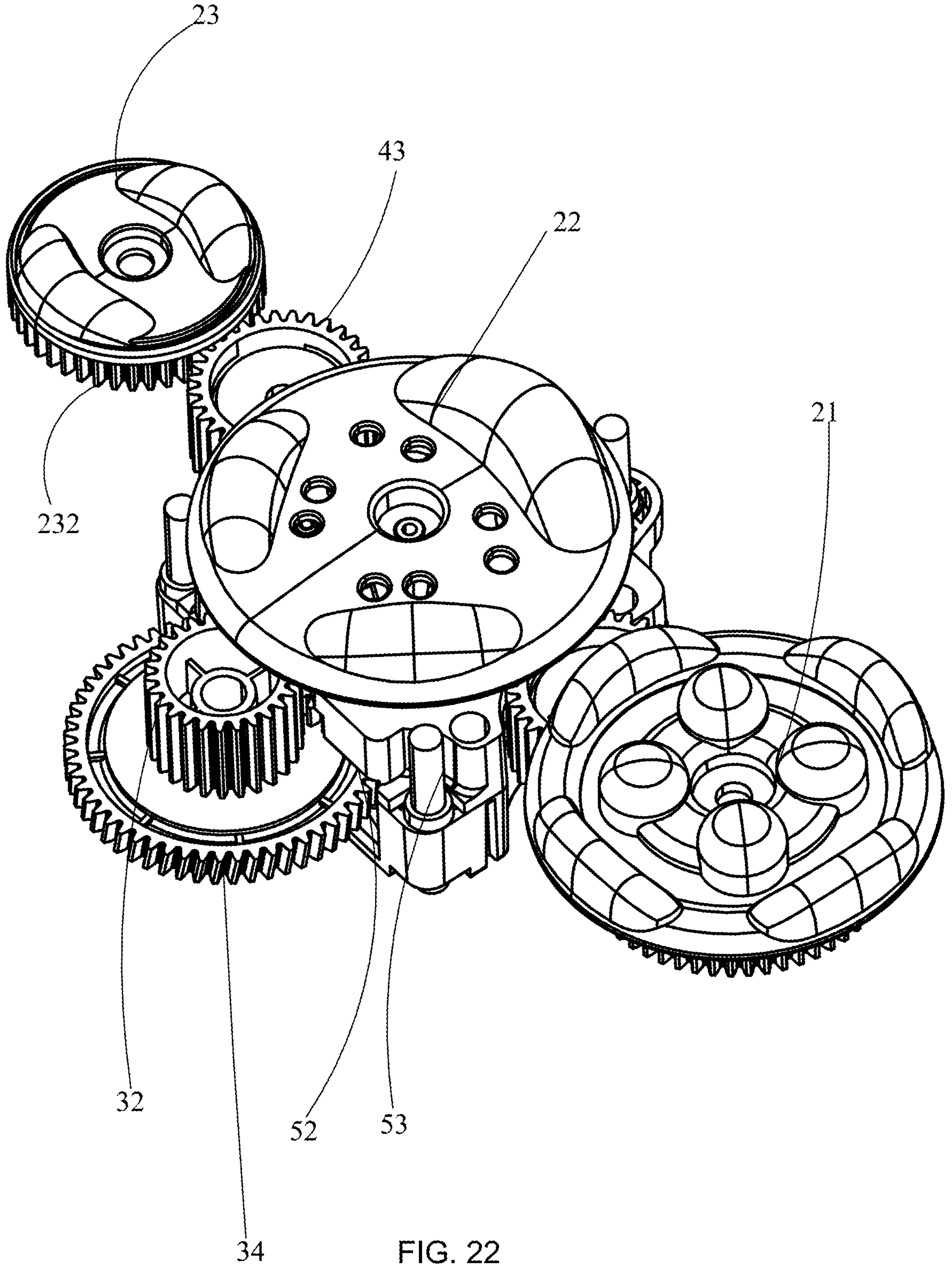
FIG. 22 is another perspective view illustrating the foot massage units and the gear train assembly of the foot arch massage arrangement according to the first embodiment of the present invention.

As shown in FIG. 18 of the drawings, the arch massage part 22 further comprises a support plate 225 and a plurality of heating members 226 arranged on the support plate 225, the turntable 221 of the arch massage part 22 is provided with a plurality of heat conduction holes 227 which are respectively aligned with the plurality of heating members 226, so that the heat generated by each heating member 226 is able to be transferred to the foot of the user through the corresponding heat conduction hole 227 in the turntable 221 for warming up the foot of the user. The support plate 225 is mounted on top of the mounting case 52 and is located between the mounting case 52 and the corresponding arch massage part 22. The support plate 225 and the heating members 226 are able to move up and down along with the movement of the mounting case 52.

The alignment of the heat conduction holes 227 with the heating members 226 allows heat to travel directly from the heating source to the foot of the user with minimal thermal loss. This increases heating efficiency and response time compared to designs where heat must pass through multiple layers.

Because the heating members 226 move vertically with the elevating assembly, the user receives both height-adjusted mechanical stimulation and temperature therapy at the same location. This dual-action massaging effect enhances relaxation and improves the relief of muscle stiffness. In addition, the plurality of heating members 226 arranged beneath the turntable 221 provide multi-point, evenly distributed warming. This prevents localized overheating and ensures that the entire foot arch receives consistent warmth.

Accordingly, warming the foot arch enhances blood circulation, promotes metabolic activity, and increases the effectiveness of the massage. The heat also softens muscles and fascia, making mechanical kneading more comfortable and effective. The warming function rapidly increases foot temperature, improving comfort when the device is used in cold climates or by users with poor peripheral circulation.

Because the support plate 225 and heating members 226 move together with the elevating assembly 5, the heating effect remains consistent regardless of whether the arch massage part 22 is at a higher or lower position. This ensures a stable heating experience even during dynamic height adjustments.

In this embodiment, each foot massage unit 2 further comprises the forefoot massage part 21 which comprises the turntable 211 having the shaft hole 213, and the gear 212 fixed to the bottom of the turntable 211. The base 214 that engages with the shaft hole 213 is fixed on the housing 1 to allow the rotation of the turntable 211. The plurality of massage protrusions 215 arranged on the turntable 211 and the plurality of massage ball heads 216 arranged circumferentially around the shaft hole 213 are arranged to massage the forefoot part of the user.

The hindfoot massage part 23 comprises the turntable 231 having the shaft hole 223, the gear 232 fixed to the bottom of the turntable 231, and the shaft hole 233 passes through the middle of the turntable 231 and the gear 232. A base 234 that engages with the shaft hole 233 is fixed on the housing 1 to allow the rotation of the turntable 231. The plurality of massage protrusions 235 are arranged on the turntable 231 to massage the hindfoot of the user.

In this embodiment, each foot massage unit 2 can be driven by the same gear train assembly 4 and the drive mechanism 3, the turntables 211, 221 and 231 are simultaneously driven to rotate to drive the massage protrusions 215, 224 and 235 to massage different areas of the foot of the user.

It is worth mentioning that when the airbag 51 is inflated, the massage protrusions 224 of the arc massage part 22 can be moved to a position higher than the massage protrusions 215 of the forefoot massage part 21 and the massage protrusions 235 of the hindfoot massage part 23.

By elevating the arch massage part 22 above the levels of the forefoot and hindfoot massage parts 21 and 23, a more concentrated and deeper stimulation is applied to the foot arch which is a region that typically requires stronger pressure for relaxation. This enables the device to provide a more effective shiatsu-like or kneading-type arch massage.

The height difference among the three massage parts 21, 22 and 23 creates a staggered, three-dimensional massage contour along the sole of the foot. This structural arrangement delivers a more dynamic and layered tactile experience, improving comfort and reducing massage monotony. By selectively raising the arch massage protrusions, the system automatically adapts to users with varying arch heights. Users with high arches receive fuller support, whereas users with flat or low arches benefit from additional upward pressure that compensates for lack of natural curvature. Elevating the arch massage region enhances stimulation of key acupressure points typically located at the arch area. This promotes circulation, relieves tension, and improves the overall therapeutic effect.

Since the forefoot and hindfoot massage protrusions remain at a lower height, the system prevents excessive pressure from being simultaneously applied across all three regions. This balanced layout avoids discomfort and reduces the risk of overstimulation. The height differential helps guide the foot of the user into a natural curvature during massage, providing a smoother transition from forefoot to arch to hindfoot. This enhances ergonomics and reduces localized strain.

The forefoot massage part 21 and the hindfoot massage part 23 are respectively provided with independent turntables, gears, and base-supported rotating shafts, enabling stable and smooth rotational motion during operation. This structural arrangement ensures that the massage protrusions can accurately target the forefoot and hindfoot regions of the user, thereby improving massage precision and comfort.

Because all turntables within each foot massage unit are simultaneously driven by a common gear train assembly and drive mechanism, synchronized rotation is achieved without the need for separate motors. This simplifies the internal structure, reduces manufacturing cost, and increases overall reliability.

The gear train assembly 4 comprises a driving gear 41 rotatably provided in each mounting case 52. The mounting case 52 comprises a case body 521 having an inner chamber 522, the driving gear 41 is rotatably disposed in the inner chamber 522 of the corresponding mounting case 52. The case body 521 comprises an upper case portion 5211 and a lower case portion 5212 mounted to the upper case portion 5211 to define the inner chamber 522. The case body 521 further comprises a bottom base 5213 which is protruded from the lower case portion 5212 and extended into the inner chamber 522, the bottom base 5213 has an engaging hole 5214, a bottom of the driving gear 41 is provided with an engaging post 412 which is engaged with the engaging hole 5214 in a manner that the rotation of the driving gear 41 is allowed on the bottom base 5213.

The engaging post 412 of the driving gear 41 engaging with the engaging hole 5214 of the bottom base 5213 enables the driving gear 41 to be rotatably supported at a precise rotational axis. This structural support prevents wobbling, eccentric rotation, or drifting of the driving gear 41 during high-torque or high-speed operation, thereby ensuring consistent and smooth transmission of motion to the subsequent gears of the gear train assembly 4.

The case body 521 comprises the upper case portion 5211 and the lower case portion 5212 which cooperatively encase the driving gear 41 and define the inner chamber 522. This enclosed structure increases the rigidity of the mounting case 52 and prevents deformation or spreading of the case body 521 when external force or downward pressure from the foot of the user is applied during massage. As a result, the motion of the internal driving gear 41 remains accurate and unaffected by external loads.

The bottom base 5213 provides a dedicated bearing-like surface for the engaging post 412 to rotate upon. This prevents metal-to-metal friction between the driving gear 41 and the lower case portion 5212 and distributes load evenly across the bottom base 5213. As a result, wear on both the gear and the mounting case is greatly reduced.

The engaging post 412 and engaging hole 5214 define a precise rotation center. This ensures that the pitch circle of the driving gear 41 remains consistently aligned with the transition gears 42 and 43 of the gear train assembly 4, reducing the risk of gear skipping, tooth noise, or loss of power transmission.

Accordingly, in this embodiment, two sides of the driving gear 41 are respectively meshed with the transition gears 42 and 43 of the gear train assembly 4, a thickness of the driving gear 41 is lower than a thickness of each of the transition gears 42 and 43, the driving gear 41 is driven to move up and down along with the corresponding mounting case 52 and also can be driven to rotate in the mounting case 52 by the drive mechanism 3.

As the mounting case 52 moves up and down under the actuation of the airbag 51, the driving gear 41 carried by the mounting case 52 is also driven to move up and down. At the same time, the driving gear 41 can still be driven to rotate within the mounting case 52 by the drive mechanism 3, thereby continuously transmitting rotational power to the transition gears 42 and 43 and subsequently to the forefoot massage unit 21, the arch massage part 22 and the hindfoot massage unit 23.

Because the driving gear 41 is thinner than the transition gears 42 and 43, the thicker transition gears 42 and 43 remain axially overlapped with the driving gear 41 throughout the entire vertical travel of the mounting case 52. This ensures uninterrupted meshing and eliminates the risk of disengagement when the arch massage part 22 is raised or lowered.

Figure 23:
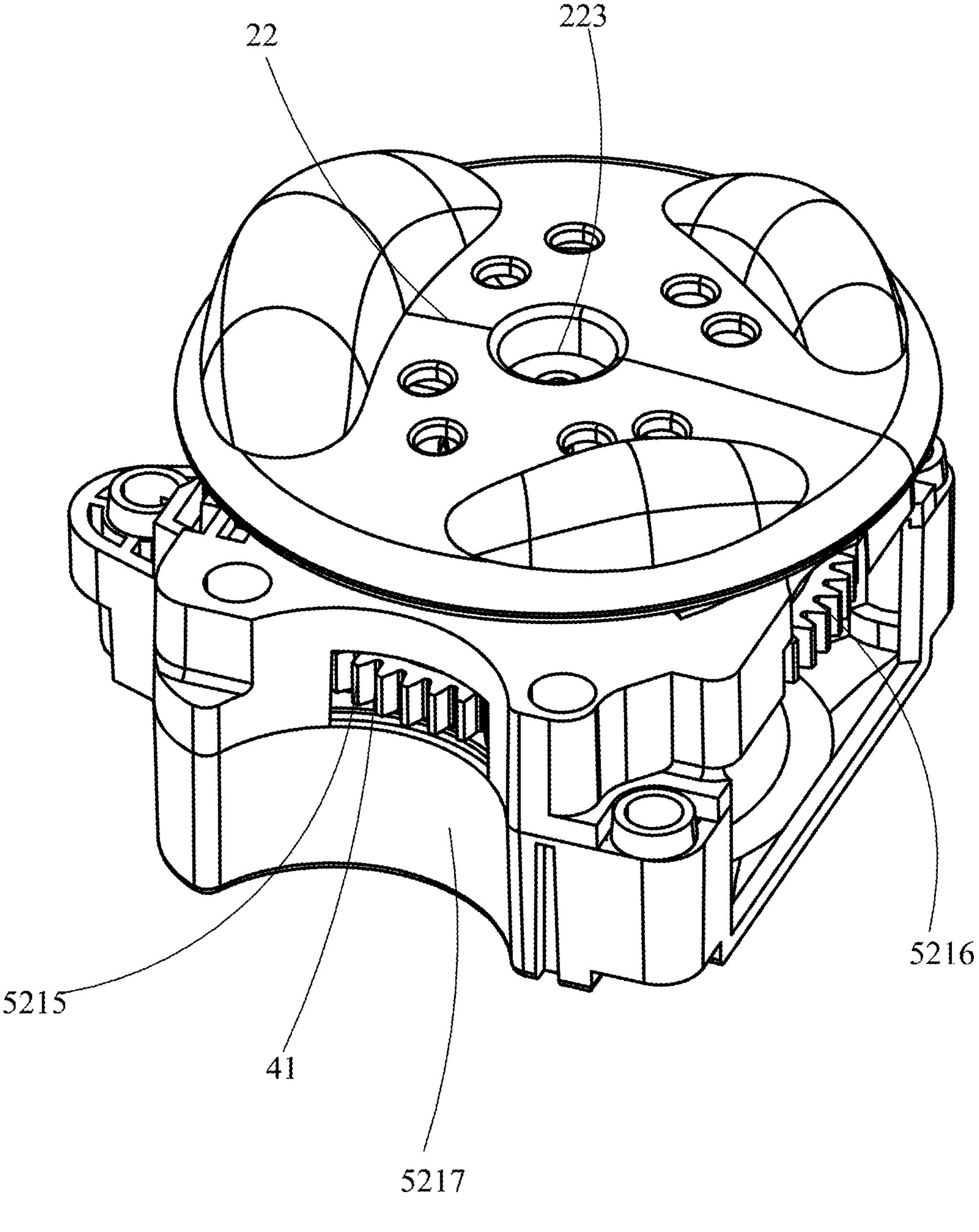
FIG. 23 is an enlarged view illustrating the mounting case of the foot arch massage arrangement according to the first embodiment of the present invention.
Figure 24:
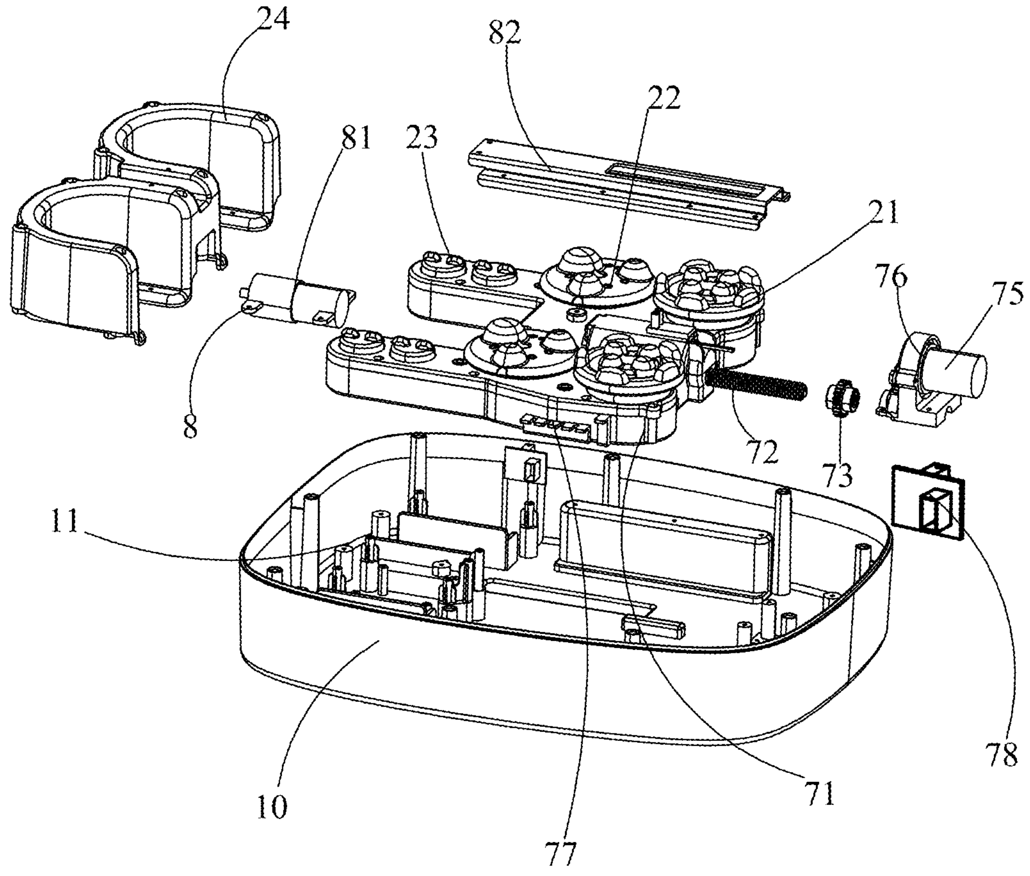
FIG. 24 is an exploded view illustrating a foot arch massage arrangement according to a second embodiment of the present invention.
Figure 25:
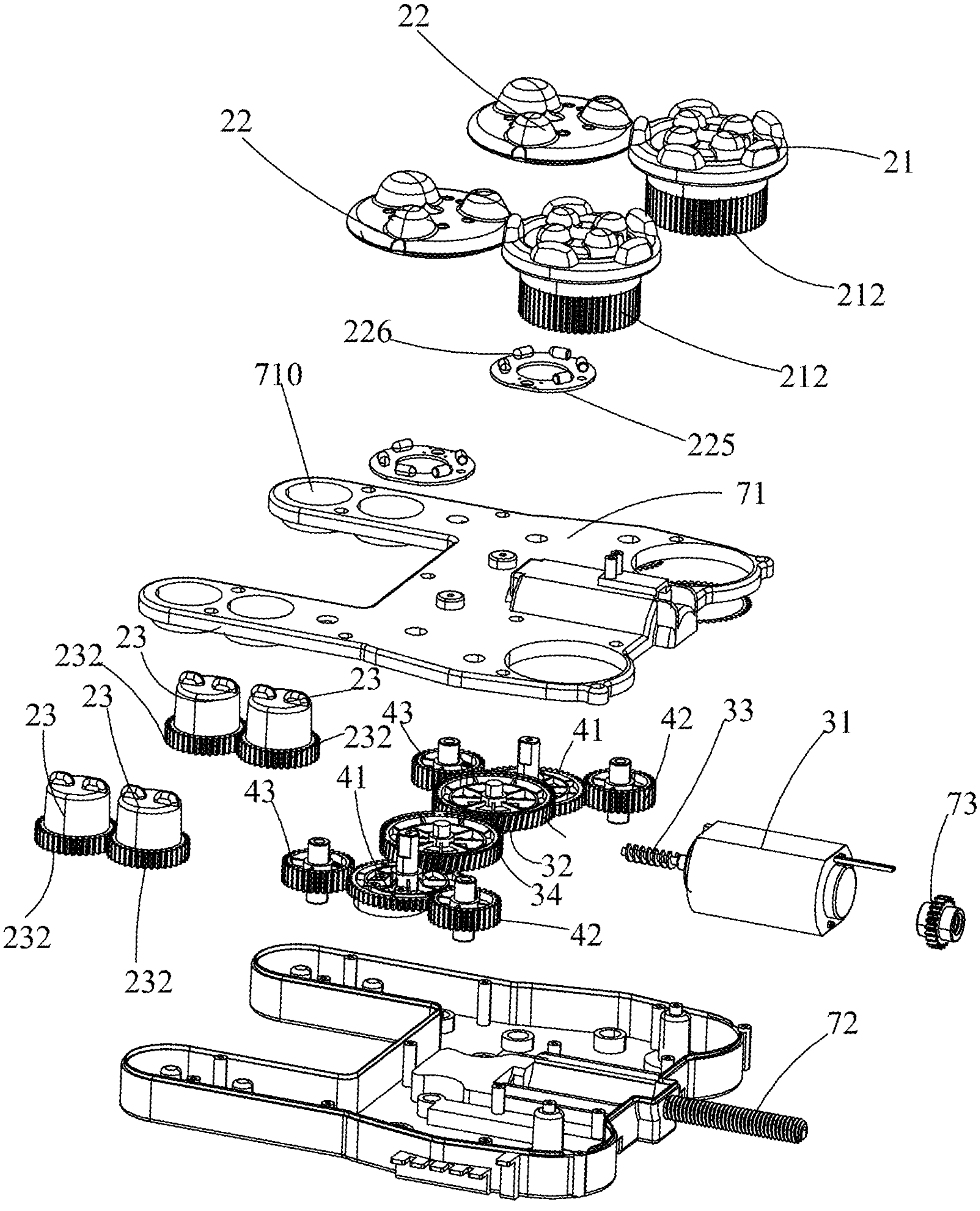
FIG. 25 is a further exploded view illustrating the foot arch massage arrangement according to the second embodiment of the present invention.
Figure 26:
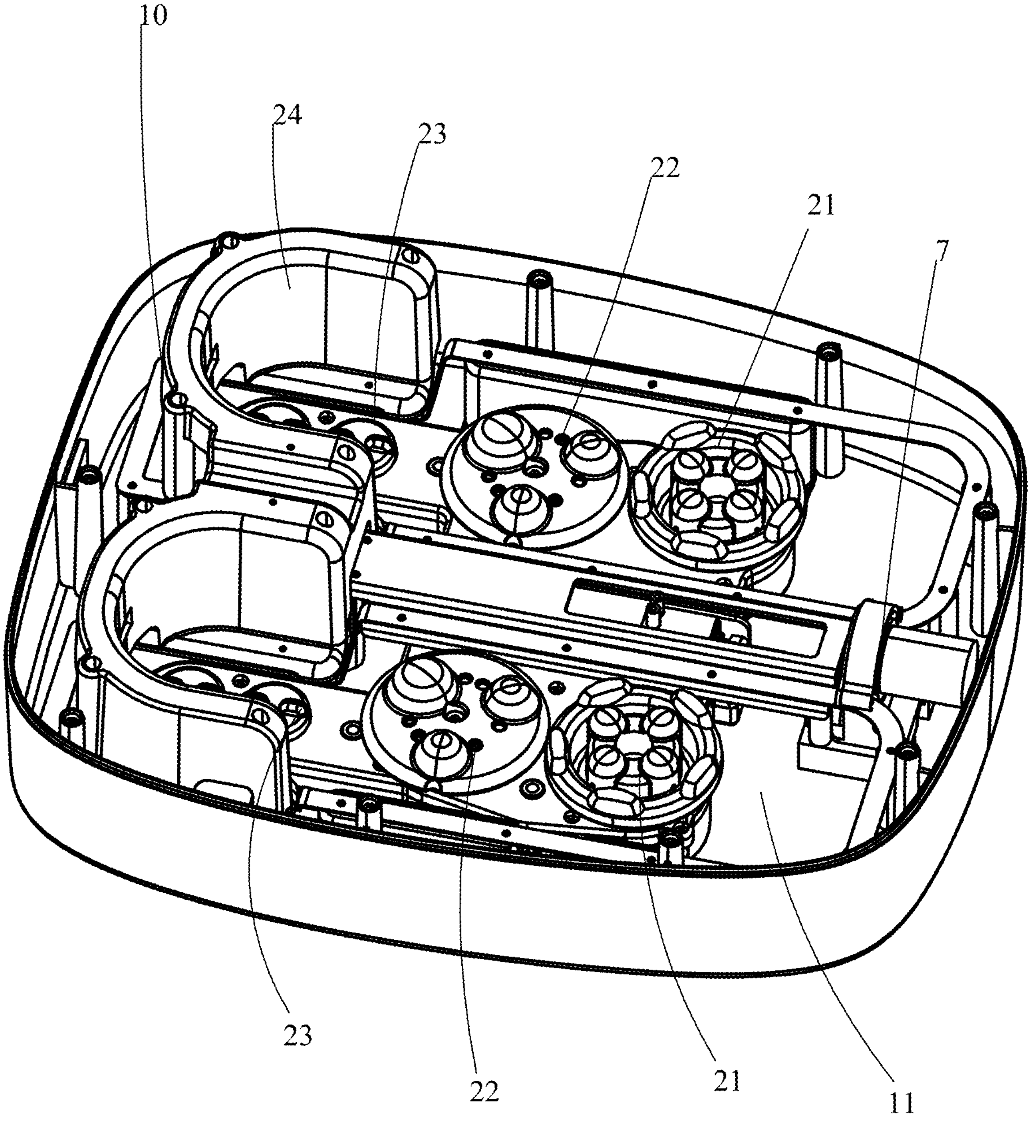
FIG. 26 is an enlarged view illustrating the foot arch massage arrangement according to the second embodiment of the present invention, wherein a top housing part of the housing is removed.
Figure 27:
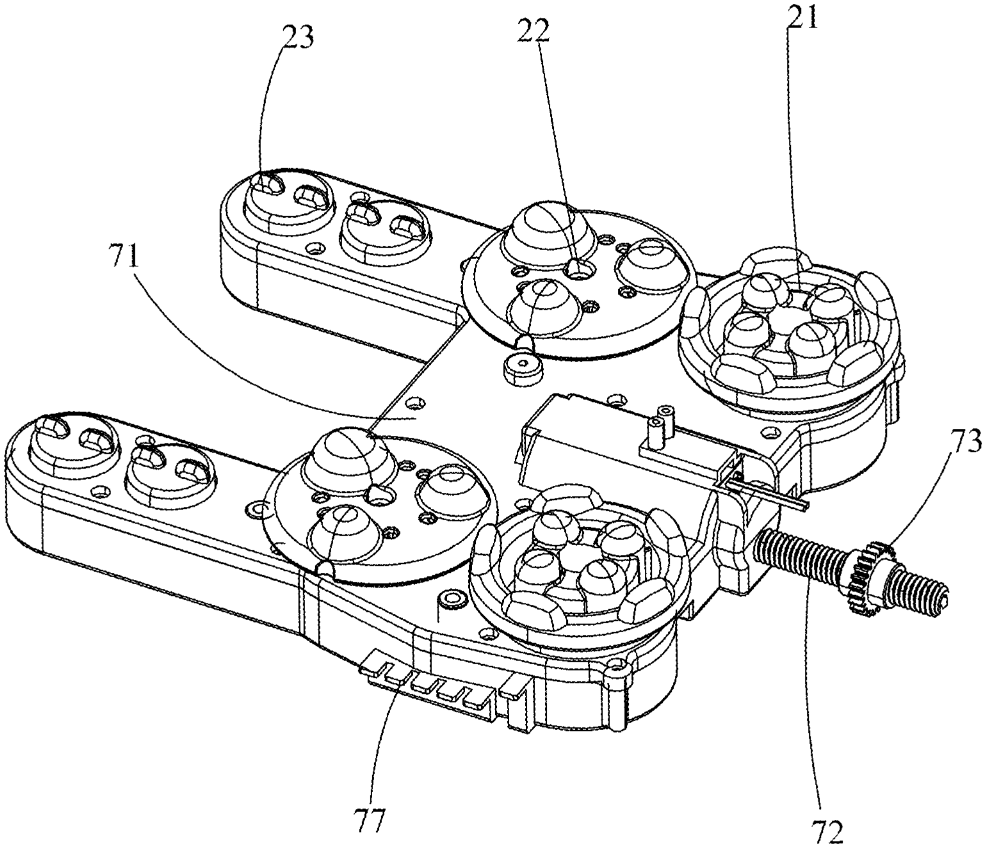
FIG. 27 is a perspective view illustrating the foot massage units and the forward-and-backward drive mechanism of the foot arch massage arrangement according to the second embodiment of the present invention.
Figure 28:
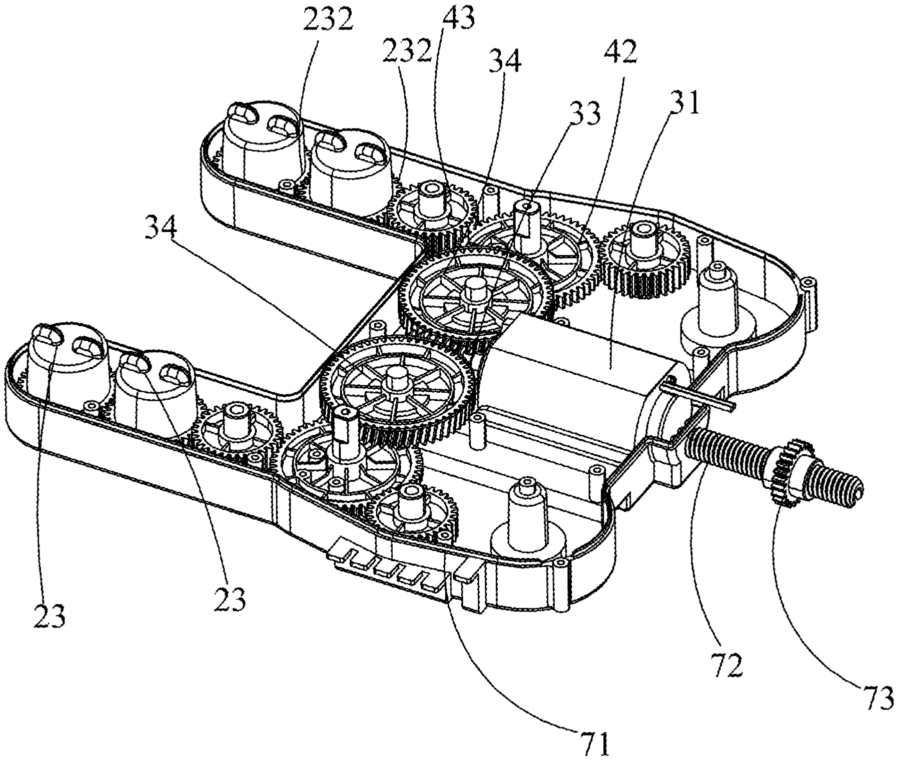
FIG. 28 is another perspective view illustrating the foot massage units and the forward-and-backward drive mechanism of the foot arch massage arrangement according to the second embodiment of the present invention, wherein a top case portion of the sliding case is removed.
Figure 29:
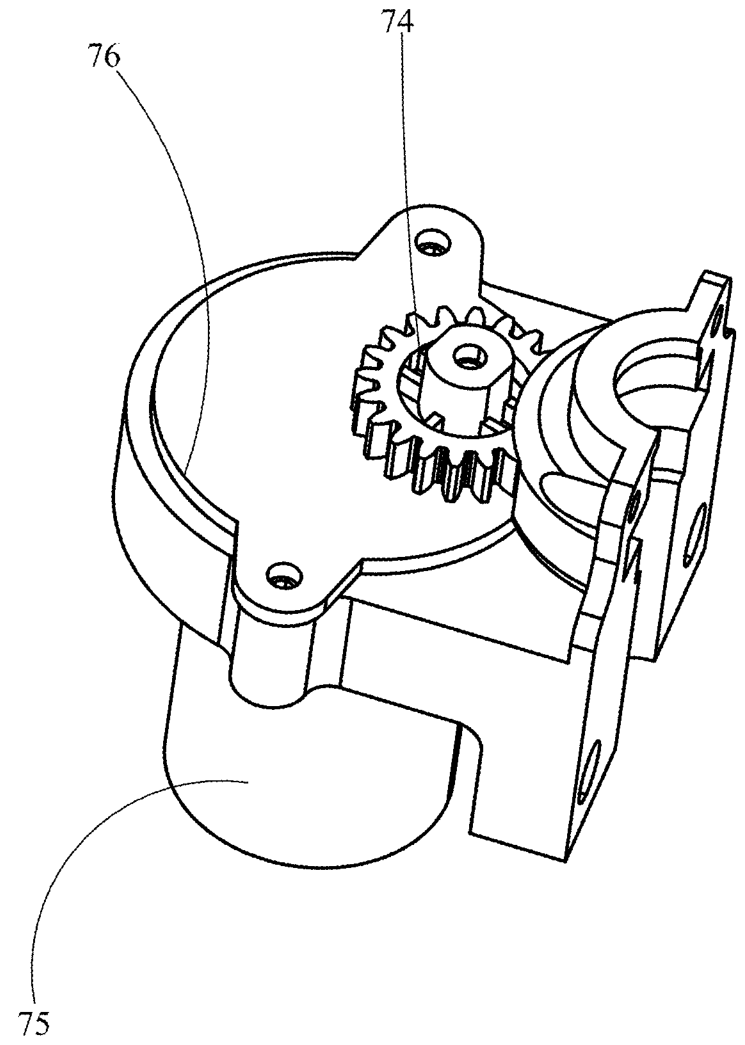
FIG. 29 is a perspective view illustrating the actuator motor, the motor fixing frame and the reduction gear of the forward-and-backward drive mechanism of the foot arch massage arrangement according to the second embodiment of the present invention.

In addition, referring to FIGS. 18 and 23 of the drawings, the mounting case 52 may have two indented grooves 5217 at two opposite sides thereof for at least partially accommodating the two transition gears 42 and 43.

When the mounting case 52 and the driving gear 41 move vertically due to inflation or deflation of the airbag 51, the gear thickness difference provides an axial tolerance zone. This allows the driving gear 41 to maintain smooth torque transmission without imposing excessive lateral forces or tooth interference on the transition gears 42 and 43.

The ability of the driving gear 41 to move up and down while still remaining fully functional allows the elevation assembly 5 to lift or lower the arch massage part 22 without requiring a separate or complex vertical compensation structure.

The case body 521 further has two meshing ports 5215 exposing the teeth 410 of the driving gear 41, the teeth 420 of the transition gear 42 and the teeth 430 of the transition gear 43 are respectively meshed with the teeth 410 of the driving gear 41 exposed at the two meshing ports 5215.

The two meshing ports 5215 define precise positions where the transition gears 42 and 43 engage with the driving gear 41. This structural constraint ensures that the meshing locations of the gear teeth are fixed and repeatable, thereby improving gear alignment accuracy and reducing the likelihood of gear displacement or misalignment during operation.

The drive mechanism 3 comprises the motor 31 and two transmission gears 32. The motor 31 is fixed inside the housing 1. The output end of the motor 31 is connected to the worm shaft 33 located between the two foot arch massage parts 22. Two worm gears 34 are meshed on two sides of the worm shaft 33. The two transmission gears 32 are respectively coaxially fixed on the top of the two worm gears 34, and each transmission gear 32 is meshed with the driving gear 41.

The case body 521 of the mounting case 52 has a transmission port 5216 exposing the teeth 410 of the driving gear 41, the teeth 320 of each transmission gear 32 is meshed with the teeth 410 of the driving gear 41 exposed at the transmission port 5216. The thickness of the driving gear 41 is also smaller than a thickness of the corresponding transmission gear 32. In other words, the driving gear 41 is also thinner than the corresponding transmission gear 32, the thicker transmission gear 32 remains axially overlapped with the driving gear 41 throughout the entire vertical travel of the mounting case 52. This ensures uninterrupted meshing and eliminates the risk of disengagement when the arch massage part 22 is raised or lowered.

A top of the driving gear 41 is provided with the connecting post 411, the case body 521 of the mounting case 52 has a top hole 523 communicated to the inner chamber 522, the support plate 225 for supporting the heating members 226 has a central hole 2251 which is aligned with the top hole 523 of the mounting case 52 and the shaft hole 223 of the arch massage part 22, the connecting post 411 is passing through the top hole 523 of the mounting case 52, the central hole 2251 of the support plate 225 and the shaft hole 223 of the arch massage part 22, so that the arch massage part 22 is driven to rotate by the driving gear 41.

The elevation assembly 5 further comprises one or more guide columns 53 which are fixed in the housing 1, the case body 521 of the mounting case 52 has one or more guide holes 524 aligned with the one or more guide columns 53, the engagement between the guide columns 53 and the corresponding guide holes 524.

Accordingly, when the airbag 51 inflates or deflates, the moving path of each mounting case 52 is restricted by the corresponding guide column 53, and each mounting case 52 is only able to linearly move up and down while the rotation of the mounting case 52 is prevented by the vertical fixed guide column 53.

The guide columns 53 and the guide holes 524 together form a precise linear guide mechanism that ensures smooth and accurate vertical displacement of the mounting case 52 without tilting or wobbling. By preventing rotational movement of the mounting case 52, the meshing between the driving gear 41 and the transmission gear 32 remains consistently aligned, ensuring uninterrupted torque transmission during upward or downward movement. Because unwanted rotational loads are eliminated, the mechanical stress on the gear teeth, the mounting case, and the airbag structure is significantly reduced, thereby prolonging the service life of the elevation system.

Furthermore, each foot massage unit 2 further comprises an ankle support frame 24 which comprises a bottom wall 241 having an elongated groove 242, and a surrounding wall 243 which has an arch inner surface 2431 for fitting with the hindfoot and ankle of the user. The bottom wall 241 of the ankle support frame 24 is able to support the hindfoot of the user, the hindfoot massage part 23 is disposed in the elongated groove 242 for massaging the hindfoot above the bottom wall 241 of the ankle support frame 24.

The surrounding wall 243 with an arched inner surface 2431 conforms closely to the natural contour of the hindfoot and ankle. This anatomical matching provides stable lateral support, reduces unwanted movement during massage, and improves user comfort during prolonged use.

The bottom wall 241 and the surrounding wall 243 cooperate to form a semi-enclosed support cradle. This structure stabilizes the hindfoot and ankle in a fixed position, ensuring that the massage forces generated by the hindfoot massage part act precisely on the intended acupressure points without slippage.

By positioning the hindfoot massage part 23 inside the elongated groove 242, the structure ensures that the massage protrusions 235 closely contact the hindfoot from below. The stable support surface minimizes energy loss caused by foot movement, enabling more efficient and effective massage.

The elongated groove 242 guides the position of the hindfoot, ensuring that the hindfoot massage part consistently targets the correct region. This improves massage precision and results in a more consistent therapeutic effect.

It is worth mentioning that the two foot massage units 2 in this embodiment are driven by the same motor 31. Alternatively, the two foot massage units 2 can be driven by two independent motors 31.

Referring to FIGS. 24 to 30 of the drawings, a foot arch massage arrangement according to a second embodiment of the present invention is illustrated, the foot arch massage arrangement comprises a housing 1 having an inner cavity 11, one or more foot massage units 2 which are arranged inside the housing 1, a drive mechanism 3 which is fixed inside the housing 1 at a middle of the housing 1, a gear train assembly 4 connected between the one or more foot massage units 2 and the drive mechanism 3, and a forward-and-backward drive mechanism 7 for driving the foot massage units 2 to move back and forth in the housing 1.

The foot arch massage arrangement may further comprise an air cushioning assembly 8 which comprises an air inflation pump 81 and a pressing piece 82 connected to the air inflation pump 81, so that the pressing piece 82 can be inflated to apply pressure on the foot between the pressing piece 82 and the corresponding foot massage unit 2.

Each foot massage unit 2 comprises a forefoot massage part 21, an arch massage part 22, and a hindfoot massage part 23, each of the forefoot massage part 21, the arch massage part 22, and the hindfoot massage part 23 comprises a turntable, massage protrusions arranged on the turntable. Each of the forefoot massage parts 21 comprises a gear 212 and each hindfoot massage part 23 further comprises a gear 232. The structure of each forefoot massage part 21, the arch massage part 22, and the hindfoot massage part 23 is similar to the first embodiment and will not be described in detail.

The gear trains assembly 4 comprises two driving gears 41, each driving gear 41 is engaged with a transition gear 42 meshing with the gear 212 of the forefoot massage part 21, and a transition gear 43 meshing with the gear 232 of the hindfoot massage part 23. The drive mechanism 3 comprises a motor 31 and two transmission gears 32. The motor 31 is fixed inside the housing 1. The output end of the motor 31 is connected to a worm shaft 33 located between the two foot massage units 2. Two worm gears 34 are meshed on two sides of the worm shaft 33. The two transmission gears 32 are respectively coaxially fixed on the top of the two worm gears 34, and each transmission gear 32 is meshed with the driving gear 41.

In this embodiment, the forward-and-backward drive mechanism 7 comprises a sliding case 71 for receiving the two foot massage units 2, a lead screw 72 fixed to the sliding case 71, a rotation nut 73 coupled with the lead screw 72 through inner threads, a reduction gear 74 meshed with outer teeth of the rotation nut 73, an actuator motor 75 and a motor fixing frame 76 for fixing the actuator motor 75. The reduction gear 74 is mounted to the actuator motor 75 and is driven by the actuator motor 75 to rotate, so as to drive the rotation nut 73 to rotate, and thus the lead screw 72 is driven to rotate, and the sliding case 71 is driven by the lead screw 72 to move back and forth.

The sliding case 71 is slidable in the housing, and the sliding case 71 has a plurality of openings 710 for exposing the turntable and massage portions of all the massage parts 21, 22 and 23.

Because the rotation nut 73 is driven to rotate by the reduction gear 74 while the lead screw 72 is fixed to the sliding case 71, the linear displacement of the sliding case 71 is achieved with high positioning accuracy and excellent repeatability. This arrangement minimizes backlash and ensures that the forward-and-backward movement of the two foot massage units 2 is smooth, stable, and precisely controllable.

The use of the reduction gear 74 meshed with the external teeth of the rotation nut 73 enables the actuator motor 75 to output a large torque at a reduced rotational speed, allowing the mechanism to drive the combined mass of the two foot massage units 2 with ease. This improves load-bearing capability, reduces vibration, and enhances operational durability.

The configuration in which the rotation nut 73 rotates while the lead screw 72 performs linear motion eliminates the need for the actuator motor 75 or reduction gear 74 to travel with the sliding case 71. As a result, the overall structure is more compact, easier to assemble, and less prone to wiring fatigue or mechanical interference, thereby improving mechanical reliability and prolonging service life.

The sliding case 71 integrally supports the two foot massage units 2, allowing the entire foot-massage module to be shifted forward or backward to match different foot lengths and user sitting postures. This improves ergonomic adaptability and ensures that the arch, forefoot, and hindfoot massage components align accurately with the corresponding regions of users having different foot sizes.

In addition, the forward-and-backward drive mechanism 7 further comprises a positioning strip provided on the sliding case 77 and an optocoupler unit 78, the positioning strip 77 is configured to cooperate with the optocoupler unit 78 to control the forward and rearward positions. The optocoupler unit 78 is provided with two optocouplers respectively for controlling the resetting and positioning of the sliding case 71, so as to reset and position the foot massage units 2.

In one example, the positioning strip 77 may be a rigid or semi-rigid elongated member provided on the sliding case 71. The positioning strip 77 may be formed with one or more optical interruption features, such as cut-out slots or notches, which are configured to pass through an optical sensing region of the optocoupler unit 78. The optocoupler unit 78 may be a slotted photointerrupter comprising an infrared emitting element and a photosensitive receiving element. When the positioning strip 77 moves together with the sliding case 71, the optical path within the optocoupler unit 78 is periodically interrupted or restored, thereby generating corresponding electrical signals for detecting the resetting position and the operating position of the sliding case 71.

In another example, the positioning strip 77 may be provided with reflective and non-reflective surface regions, and the optocoupler unit 78 may be implemented as a reflective optical sensor configured to detect variations in reflected infrared light. As the sliding case 71 travels forward and backward, the reflective pattern on the positioning strip 77 causes distinguishable changes in the reflected light intensity, enabling the control circuit to determine positional states such as the home position and the designated operating position.

Alternatively, the positioning strip 77 may incorporate multiple discrete optical markings, such as a set of spaced notches or printed high-contrast codes, and the optocoupler unit 78 may include one or more optical sensing elements arranged to read the markings. By arranging at least two markings for the reset position and one or more markings for predetermined working positions, the forward-and-backward drive mechanism is able to perform accurate homing and stable positional control of the sliding case 71.

Through these structural arrangements, the optocoupler unit 78 can reliably cooperate with the positioning strip 77 to provide clear and stable positional feedback for the sliding case 71, thereby ensuring accurate forward-and-backward movement of the foot massage units 2 during operation.

In this embodiment, each foot massage unit 2 also further comprises an ankle support frame 24 which comprises a bottom wall 241 having an elongated groove 242, and a surrounding wall 243 which has an arch inner surface 2431 for fitting with the hindfoot and ankle of the user. The bottom wall 241 of the ankle support frame 24 is able to support the hindfoot of the user, the hindfoot massage part 23 is disposed in the elongated groove 242 for massaging the hindfoot above the bottom wall 241 of the ankle support frame 24.

Each foot massage unit 2 of this embodiment comprises two hindfoot massage parts 23 which are coupled with each other by the two gears 232 which are meshed with each other. When the foot massage unit 2 is driven to move towards the ankle support frame 24 along with the sliding movement of the sliding case 71, one of the two hindfoot massage parts 23 may be moved to a position under the surrounding wall 243 of the ankle support frame 24, so that the length of the massage area is formed by one hindfoot massage part 23, the arch massage part 22 and the forefoot massage part 21. When the foot massage unit 2 is driven to move away from the ankle support frame 24 along with the sliding movement of the sliding case 71, the two hindfoot massage parts 23 may be moved to a position within the elongated groove 242 of the ankle support frame 24, so that the length of the massage area is formed by the two hindfoot massage parts 23, the arch massage part 22 and the forefoot massage part 21. In other words, the foot arch massage arrangement is able to provide different lengths of massage area for fitting the different foot lengths of the different uses.

Because the two hindfoot massage parts 23 can selectively enter or withdraw from the elongated groove 242 of the ankle support frame 24 depending on the sliding position of the sliding case 71, the effective massage area can be automatically lengthened or shortened. This allows the device to accommodate users with various foot lengths without requiring manual adjustments or accessory parts.

The forward-and-backward movement of the sliding case 71 may be carried out in multiple modes to enhance massage adaptability. Specifically, the sliding case 71 can move forward or backward while the forefoot massage part 21, the arch massage part 22, and the hindfoot massage part 23 are rotating, thereby enabling continuous dynamic repositioning of the massage area during operation. Alternatively, the forward-and-backward movement may be performed before the rotation of these massage parts begins, or it may be performed during their rotation and then stopped once the desired position is reached. After the sliding case 71 is stopped, the massage parts may continue to rotate at the adjusted.

Allowing the sliding case 71 to move while the massage parts are rotating enables real-time adjustment of the massage position during operation. This dynamic adaptability ensures that the massage heads can seamlessly track and follow the foot contours of the user, accommodating different foot lengths without requiring the user to reposition their feet.

When the sliding case 71 moves before or during rotation and then stops at a precise position, the massage components can be aligned with the specific anatomical regions of the user. This improves the precision of targeted massage, such as accurately aligning the arch massage part 22 with the foot arch of the user, significantly enhancing comfort and therapeutic effect.

Because the sliding repositioning can occur automatically while the massage parts are already operating, the user does not need to lift or adjust their feet. This reduces interruption of the massage experience and prevents discomfort caused by manual readjustment.

What is claimed is:

1. A foot arch massage arrangement, comprising:

a housing;

an arch massage part disposed in said housing;

a motor, wherein when said motor is in operation, said arch massage part is driven to rotate; and an elevating assembly which is arranged to drive said arch massage part to move up and down;

wherein said elevating assembly comprises an airbag arranged under said arch massage part, said airbag is inflated to cause said arch massage part to move upward, and said airbag is deflated to cause said arch massage part to move downward;

wherein said elevating assembly comprises a mounting case, wherein said airbag is arranged under said mounting case and said arch massage part is arranged above said mounting case;

wherein the foot arch massage arrangement further comprises a driving gear which is rotatably disposed in said mounting case, wherein said driving gear is provided with a connecting post which is penetrating through said mounting case, said arch massage part is coupled to said connecting post, wherein said motor is in operation to cause said driving gear to rotate in said mounting case, said arch massage part is driven to rotate through said connecting post while said mounting case is prevented to rotate.

2. The foot arch massage arrangement according to claim 1, wherein said elevating assembly further comprises one or more guide columns fixed to said housing, wherein said mounting case is coupled to said one or more guide columns in a manner that said one or more guide columns guide the upward and downward movement of said mounting case and prevent the rotation of said mounting case.

3. The foot arch massage arrangement according to claim 1, further comprising a transmission gear which is coupled between said driving gear and said motor, wherein said mounting case has a transmission port for partially exposing said driving gear, so as to allow said driving gear to be meshed with said transmission gear, wherein when said transmission gear is driven to rotate by said motor, said driving gear is driven to rotate in said mounting case by said transmission gear.

4. The foot arch massage arrangement according to claim 3, further comprising a forefoot massage part which comprises a gear, wherein a transition gear is meshed with said gear of said forefoot massage part, wherein said mounting case has a meshing port for partially exposing said driving gear, so as to allow said driving gear to be meshed with said transition gear, so as to drive said transition gear to rotate, so that said forefoot massage part is driven to rotate by said gear meshed with said transition gear.

5. The foot arch massage arrangement according to claim 3, further comprising a hindfoot massage part and a forefoot massage part, each of said hindfoot massage part and said forefoot massage part comprises a base fixed in said housing, a turntable rotatable mounted to said base, a plurality of massage protrusions provided on said turntable and a gear, wherein a transition gear is meshed with said gear of each of said hindfoot massage part and said forefoot massage part, wherein said mounting case has two meshing ports at two opposite sides thereof for partially exposing said driving gear, so as to allow two said transition gears to be respectively meshed with said driving gear, wherein a thickness of said driving gear is smaller than a thickness of each transition gear, so as to allow said driving gear to move upward or downward along each transition gear while each of said two transition gears remain axially overlapped with said driving gear throughout an entire vertical travel of said mounting case.

6. The foot arch massage arrangement according to claim 5, wherein said hindfoot massage part and said forefoot massage part are configured to be driven to rotate when said motor is in operation, said arch massage part is configured to be driven to rotate while being driven to move up and down when said airbag is repeatedly inflated and deflated.

7. The foot arch massage arrangement according to claim 6, wherein said arch massage part comprises a turntable coupled to said connecting post, and a plurality of massage protrusions arranged on said turntable, wherein a support plate is mounted to said mounting case and is arranged between said mounting case and said turntable of said arch massage part, wherein a plurality of heating members are arranged on said support plate, wherein said support plate and said plurality of heating members are driven to move up and down along with said mounting case and are prevented to rotate when said turntable of said arch massage part is driven to rotate.

8. The foot arch massage arrangement according to claim 3, further comprising a worm shaft connected to said motor and a worm gear coupled to said worm shaft, wherein said transmission gear is coaxially arranged on top of said worm gear.

9. A foot arch massage arrangement, comprising:

a housing having an inner cavity and two foot placement openings communicated to said inner cavity;

two foot massage units disposed in said inner cavity of said housing, wherein each of said two foot massage units comprises an arch massage part;

a drive mechanism which comprises a motor and two transmission gears coupled to said motor;

a gear train assembly which comprises two driving gears which are respectively meshed with said two transmission gears; and an elevating assembly which comprises two mounting cases and an airbag which comprises two airbag portions, wherein each of said two driving gears is rotatably disposed in said two mounting cases, said two airbag portions are respectively arranged under said two mounting cases, said two arch massage parts are respectively rotatably arranged above said two mounting cases, wherein when said motor is activated, said two driving gears are respectively driven to rotate in said two mounting cases by said two transmission gears, so as to drive said two arch massage parts to rotate, wherein when said two airbag portions are inflated or deflated, said two mounting cases are corresponding move upward or downward, so as to cause said two arch massage parts to move upward or downward.

10. The foot arch massage arrangement according to claim 9, wherein each of said two mounting cases has a transmission port for partially exposing the corresponding driving gear, so as to allow each driving gear to be meshed with the corresponding transmission gear.

11. The foot arch massage arrangement according to claim 9, wherein each of said two foot massage unit further comprises a hindfoot massage part and a forefoot massage part, wherein each of said two mounting cases has two meshing ports at two opposite sides thereof for partially exposing said driving gear, wherein said gear train assembly comprises two transition gears which are respectively meshed with said driving gear through said two meshing ports, wherein each of said hindfoot massage part and said forefoot massage part comprises a gear which is meshed with the corresponding transition gear.

12. The foot arch massage arrangement according to claim 11, wherein a thickness of said driving gear is smaller than a thickness of each transition gear, so as to allow said driving gear to move upward or downward along each transition gear while each of said two transition gears remain axially overlapped with said driving gear throughout an entire vertical travel of the corresponding mounting case.

13. The foot arch massage arrangement according to claim 11, wherein each of said hindfoot massage part and said forefoot massage part comprises a base fixed in said housing, a turntable rotatable mounted to said base, a plurality of massage protrusions provided on said turntable, wherein each of said two airbag portions is arranged between said base of said hindfoot massage part and said base of said forefoot massage part.

14. The foot arch massage arrangement according to claim 11, further comprising two ankle support frames each comprising a bottom wall having an elongated groove, and a surrounding wall extended from said bottom wall, wherein each hindfoot massage part is disposed in the corresponding elongated groove, wherein said elevation assembly further comprises one or more guide columns which are fixed to said housing, each of said two mounting cases has one or more guide holes aligned and engaged with said one or more guide columns respectively.

15. The foot arch massage arrangement according to claim 9, wherein said drive mechanism further comprises a worm shaft connected to said motor and two worm gears coupled to two opposite sides of said worm shaft, wherein said two transmission gears are respectively coaxially arranged on top of said two worm gears.

16. The foot arch massage arrangement according to claim 9, wherein each of said two mounting cases comprises a case body which comprises an upper case portion and a lower case portion mounted to said upper case portion to define an inner chamber, each of said two mounting cases further comprises a bottom base which is protruded from said lower case portion and extended into said inner chamber, wherein said bottom base has an engaging hole, a bottom of each corresponding driving gear is provided with an engaging post which is engaged with said engaging hole in a manner that the rotation of each driving gear is allowed on the corresponding bottom base, wherein each of said two driving gears is provided with a connecting post which is penetrating through said upper case portion of said case body, each arch massage part is coupled to the corresponding connecting post.

17. The foot arch massage arrangement according to claim 16, wherein each of said two arch massage parts comprises a turntable coupled to the corresponding connecting post, and a plurality of massage protrusions arranged on said turntable, wherein a support plate is mounted to said upper case portion of said case body and is arranged between said mounting case and said turntable of said arch massage part, wherein a plurality of heating members are arranged on said support plate, wherein said support plate and said plurality of heating members are driven to move up and down along with said mounting case and are prevented to rotate when said turntable of said arch massage part is driven to rotate.

* * * * *